US007944600B2

(12) United States Patent
Maeda et al.

(10) Patent No.: US 7,944,600 B2
(45) Date of Patent: May 17, 2011

(54) MIRROR DEVICE WITH AN ANTI-STICTION LAYER

(75) Inventors: Yoshihiro Maeda, Hachioji (JP); Fusao Ishii, Menlo Park, CA (US); Kazuhiro Watanabe, Hachioji (JP); Hirotoshi Ichikawa, Hachioji (JP)

(73) Assignees: Silicon Quest Kabushiki-Kaisha (JP); Olympus Corporation (JP)

( * ) Notice: Subject to any disclaimer, the term of this patent is extended or adjusted under 35 U.S.C. 154(b) by 456 days.

(21) Appl. No.: 12/151,218

(22) Filed: May 2, 2008

(65) Prior Publication Data

US 2009/0231668 A1 Sep. 17, 2009

Related U.S. Application Data

(60) Provisional application No. 60/927,486, filed on May 3, 2007.

(51) Int. Cl.
*G02B 26/00* (2006.01)

(52) U.S. Cl. .................... 359/290; 359/291; 359/292

(58) Field of Classification Search .......... 359/290–292, 359/294, 298
See application file for complete search history.

(56) References Cited

U.S. PATENT DOCUMENTS

| | | | |
|---|---|---|---|
| 5,214,420 A | 5/1993 | Thompson et al. | |
| 5,331,454 A | 7/1994 | Hornbeck | |
| 5,411,769 A | 5/1995 | Hornbeck | |
| 5,447,600 A | 9/1995 | Webb | |
| 5,512,374 A | 4/1996 | Wallace et al. | |
| 5,523,878 A | 6/1996 | Wallace et al. | |
| 5,576,878 A | 11/1996 | Henck | |
| 5,579,151 A | 11/1996 | Cho | |
| 5,602,671 A | 2/1997 | Hornbeck | |
| 6,024,801 A | 2/2000 | Wallace et al. | |
| 6,053,617 A | 4/2000 | Kaeriyama | |
| 6,099,132 A | 8/2000 | Kaeriyama | |
| 6,114,044 A | 9/2000 | Houston et al. | |
| 6,259,551 B1 | 7/2001 | Jacobs | |
| 6,475,570 B2 | 11/2002 | Jacobs | |
| 6,576,489 B2 | 6/2003 | Leung et al. | |
| 6,666,979 B2 | 12/2003 | Chinn et al. | |
| 6,674,140 B2 | 1/2004 | Martin | |
| 6,808,745 B2 | 10/2004 | Yang | |
| 6,815,361 B1 | 11/2004 | Bae et al. | |
| 6,830,950 B2 | 12/2004 | Chinn et al. | |
| 6,902,947 B2 | 6/2005 | Chinn et al. | |
| 6,906,845 B2 | 6/2005 | Cho et al. | |
| 6,972,891 B2 * | 12/2005 | Patel et al. | ..... 359/290 |
| 7,009,745 B2 | 3/2006 | Miller et al. | |
| 7,045,170 B1 | 5/2006 | Hankins et al. | |
| 7,057,794 B2 | 6/2006 | Wang et al. | |
| 7,256,467 B2 | 8/2007 | Reid et al. | |
| 7,372,615 B2 | 5/2008 | Chen et al. | |
| 7,471,439 B2 | 12/2008 | Chen et al. | |
| 2003/0054588 A1 * | 3/2003 | Patel et al. | ..... 438/107 |
| 2003/0082296 A1 * | 5/2003 | Elers et al. | ..... 427/96 |
| 2003/0107465 A1 | 6/2003 | Hiraoka et al. | |
| 2004/0190817 A1 | 9/2004 | Aubuchon | |
| 2006/0213441 A1 | 9/2006 | Kobrin et al. | |
| 2007/0114882 A1 | 5/2007 | Chen et al. | |
| 2007/0117244 A1 | 5/2007 | Chen et al. | |
| 2007/0241417 A1 | 10/2007 | Huibers et al. | |
| 2008/0116554 A1 | 5/2008 | Pan | |

* cited by examiner

*Primary Examiner* — Ricky L Mack
*Assistant Examiner* — Brandi N Thomas
(74) *Attorney, Agent, or Firm* — Bo-In Lin

(57) ABSTRACT

A micromirror device includes an elastic hinge for supporting a mirror on a substrate, and an address electrode for deflecting the mirror. The device further includes a protective layer and an oriented monolayer laid to cover a stopper also functioning as an address electrode provided below the mirror and between the mirror and the substrate.

20 Claims, 19 Drawing Sheets

Fig. 1A (Prior Art)
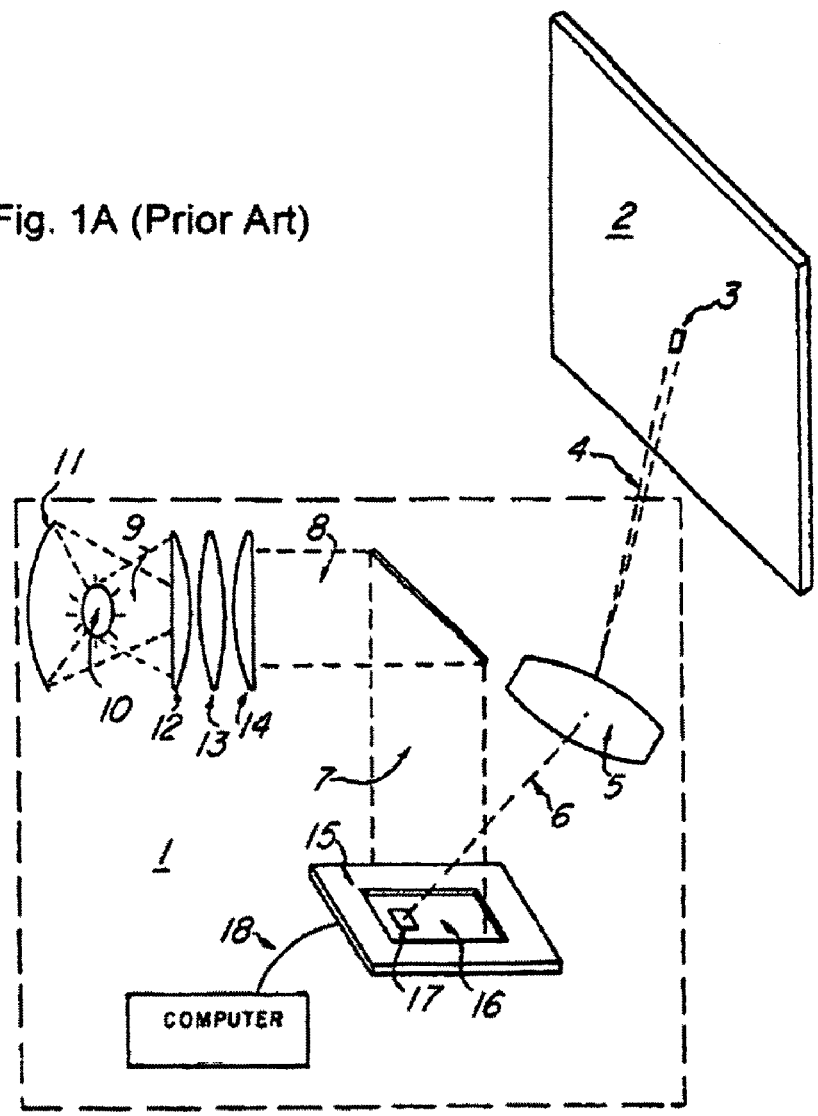
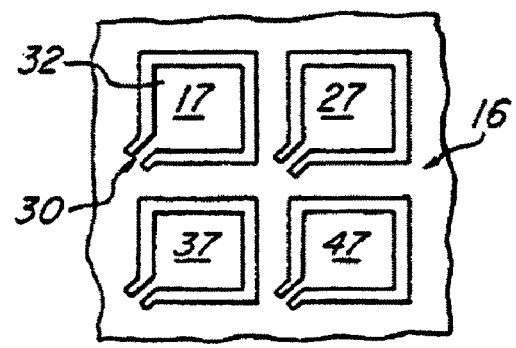
FIG. 1B (Prior Art)

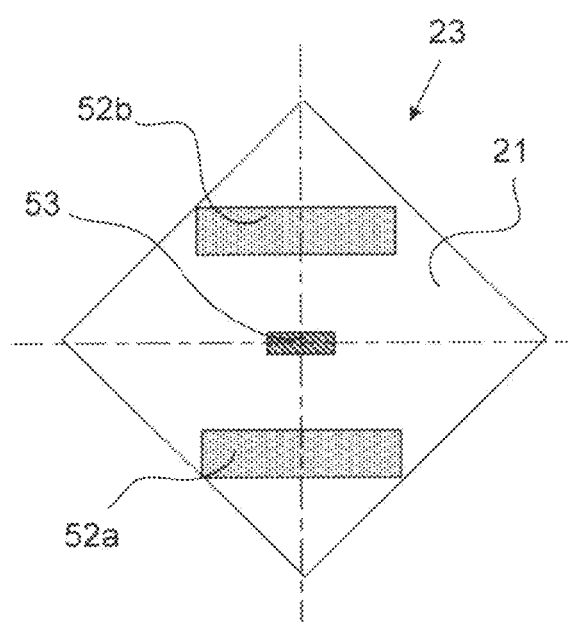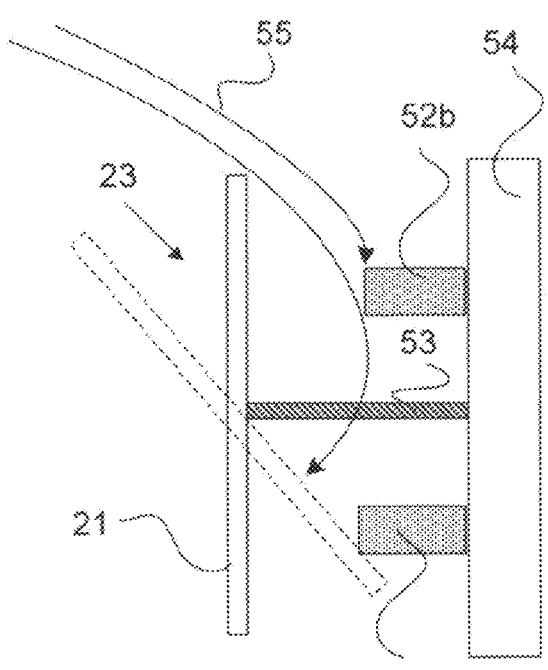
FIG. 5A
FIG. 5B

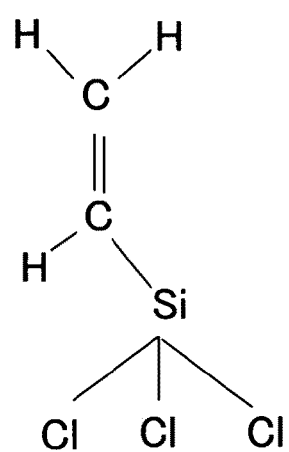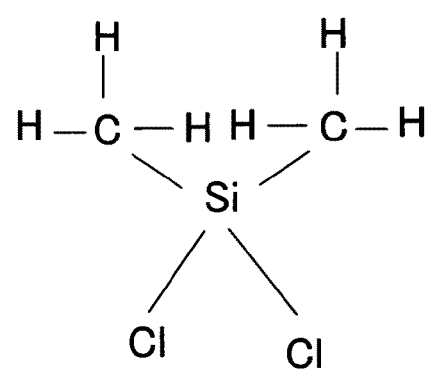
FIG. 7 A
VTS
(vinyltrichlorosilane)
FIG. 7 B
DDS
(dichlorodimethylsilane)

PFODCS
(Perfluorooctdimethylchlorosilane)

MIRROR DEVICE WITH AN ANTI-STICTION LAYER

This application is a Non-provisional application claiming a Priority date of May 3, 2007 based on a previously filed Provisional Application 60/927,486 filed by the common Applicants of this Application and the disclosures made in Provisional Application 60/927,486 are further incorporated by reference.

BACKGROUND OF THE INVENTION

1. Field of the Invention

The present invention relates to a method and device configuration of a micromirror device manufactured by applying the technologies of Micro Electro Mechanical Systems (MEMS). More particularly, this invention relates to a method and device configuration for manufacturing a deflective micromirror device for preventing stiction between a micromirror and a substrate after an etching process.

2. Description of the Related Arts

After the dominance of CRT technology in the display industry, Flat Panel Display (hereafter FPD) and Projection Display gained popularity because of a smaller form-factor and a larger size of screen. In several types of projection displays, projection displays using micro-displays are gaining consumers' recognition because of high performance of image quality as well as lower cost than FPDs. There are two types of micro-displays used for projection displays in the market. One is a micro-LCD (Liquid Crystal Display) and the other is a display using micromirror technology such as a micromirror device. Because the micromirror device uses an un-polarized light, a micromirror device has an advantage of projecting images with greater brightness than the images displayed by the micro-LCD devices using the polarized light.

There are semiconductor-processing technologies that include techniques and systems for generating a micro electro mechanical structure and electric control circuits supported on a semiconductor substrate to configure the above-mentioned micromirror device. These technologies are generally referred to as MEMS (micro electro mechanical systems). Recently, the MEMS technologies have been applied in various fields such as an RF radio oscillator, an acceleration sensor, optical communications, a display, etc. In the display field, the MEMS technologies have been applied to manufacture a micromirror device as commercial products in which several millions of substantially square mirrors of about 10 μm square are arranged vertically and horizontally in a two-dimensional array.

Even though there are significant advances made on the technologies of implementing electromechanical micromirror devices as spatial light modulator in recent years, there are still limitations and difficulties when it was employed to a high quality image display. Specifically, when the display are digitally controlled, the image quality are adversely affected due to the fact that the image is not displayed with a sufficient number of gray scales.

Electromechanical micromirror devices have drawn considerable interest because of their application as spatial light modulators (SLMs). A spatial light modulator requires an array of a relatively large number of micromirror elements. In general, the number of micromirror elements required ranges from 60,000 to a several of millions in a SLM.

Referring to FIG. 1A for an image display system 1 including a screen 2 is disclosed in a reference U.S. Pat. No. 5,214,420. A light source 10 is used for generating light energy for illuminating the screen 2. The generated light 9 is further collimated and directed toward a lens 12 by a mirror 11. Lenses 12, 13 and 14 form a beam columnator operative to columnate light 9 into a column of light 8.

A spatial light modulator (SLM) 15 is controlled on the basis of data input by a computer 19 via a bus 18 and selectively redirects the portions of light from a path 7 toward an enlarger lens 5 and onto screen 2. The SLM 15 has a mirror array includes switchable reflective elements 17, 27, 37, and 47 each comprising a mirror 33 connected by a hinge 30 and supported on a surface 16 of a substrate in the electromechanical mirror device as shown in FIG. 1B.

When the element 17 is in one position, a portion of the light from the path 7 is redirected along a path 6 to lens 5 where it is enlarged or spread along the path 4 to impinge on the screen 2 so as to form an illuminated pixel 3. When the element 17 is in another position, the light is redirected away from the display screen 2 and hence the pixel 3 is dark.

Each of the mirror elements 17, 27, 37, and 47 implemented in a micromirror device 16 as shown in FIGS. 1A and 1B is configured to include a micromirror and an address electrode. By applying a voltage to the address electrode, the micromirror is controlled to tilt by a Coulomb force works between the micromirror and the address electrode. In this specification, the operation that causes "a micromirror tilts" is described as "a micromirror deflects".

As the Coulomb force deflects the micromirror that also changes the direction of the reflection of incident light by the deflection angle of the mirror. In this specification, the direction of the reflected light for projecting almost all incident light toward the light path of image display is referred to as "ON light". Conversely, as the reflected light is projected in the direction away from the light path for image display, the micromirror is referred to as operation in an "OFF state".

A micromirror is controlled to operate in an intermediate state during the time when the micromirror is deflected in the angular positions when the incident light is reflected between the ON-state and the OFF-state. According to the system configuration of this invention, a portion of the reflected light smaller the amount of light reflected in the ON-state is controlled and directed to project a reduced light intensity for image display. The levels of gray scales are increased because the least amount of controllable light projection for image display is reduced.

By applying a voltage to the address electrode, a Coulomb force is generated to deflect the surface of the micromirror to different tilt angles and comes into contact with an address electrode or a stopper supported on the substrate. The tilt angles of the mirror surface of each of the mirror elements 17, 27, 37, and 47 are controlled to direct to different predefined angles thus allows a control circuit to control the reflection of the incident light to the ON light state or the OFF light state.

Most of the conventional image display devices such as the devices disclosed in U.S. Pat. No. 5,214,420 are implemented with a dual-state mirror control that controls the mirrors to operate at a state of either ON or OFF. The quality of an image display is limited due to the limited number of gray scales. Specifically, in a conventional control circuit that applies a PWM (Pulse Width Modulation), the quality of the image is limited by the LSB (least significant bit) or the least pulse width as control related to the ON or OFF state. Since the mirror is controlled to operate in an either ON or OFF state, the conventional image display apparatuses have no way to provide a pulse width to control the mirror that is shorter than the control duration allowable according to the LSB. The least quantity of light, which determines the least amount of adjustable brightness for adjusting the gray scale, is the light reflected during the time duration according to the least pulse width. The limited gray scale due to the LSB limitation leads to a degradation of the quality of the display image.

Specifically, FIG. 1C exemplifies a control circuit for controlling a mirror element according to the disclosure in the U.S. Pat. No. 5,285,407. The control circuit includes a memory cell 32. Various transistors are referred to as "M*" where "*" designates a transistor number and each transistor is an insulated gate field effect transistor. Transistors M5 and M7 are p-channel transistors; while transistors M6, M8, and M9 are n-channel transistors.

The capacitances C1 and C2 represent the capacitive loads in the memory cell 32. The memory cell 32 includes an access switch transistor M9 and a latch 32a, which is based on a Static Random Access switch Memory (SRAM) design. The transistor M9 connected to a Row-line receives a DATA signal via a Bit-line. The memory cell 32-written data is accessed when the transistor M9 that has received the ROW signal on a Word-line is turned on. The latch 32a consists of two cross-coupled inverters, i.e., M5/M6 and M7/M8, which permit two stable states, that is, a state 1 is Node A high and Node B low, and a state 2 is Node A low and Node B high.

FIG. 1D shows the "binary time periods" in the case of controlling SLM by four-bit words. As shown in FIG. 1D, the time periods have relative values of 1, 2, 4, and 8 that in turn determine the relative quantity of light of each of the four bits, where the "1" is least significant bit (LSB) and the "8" is the most significant bit. According to the PWM control mechanism, the minimum quantity of light that determines the resolution of the gray scale is a brightness controlled by using the "least significant bit" for holding the mirror at an ON position during a shortest controllable length of time.

In a simple example with n bits word for controlling the gray scale, one frame time is divided into $(2^n-1)$ time slices and each slice has an equal length of time. If one frame time is 16.7 msec., each time slice is $16.7/(2^n-1)$ msec.

Having fixed the length for each of these time slices for each pixel of each frame, the light intensities for displaying each pixel are quantized. A pixel for displaying a black light is assigned with a 0 time slice, the intensity level represented by the LSB is 1 time slice, and maximum brightness is $2^n-1$ time slices. The on-time during a frame period controls the pixel's quantized intensity of display. Thus, during a frame period, the light intensity of each pixel is controlled to correspond with a quantized value of the number of time slices. The viewer's eye integrates the pixel brightness to perceive the image with a level of brightness as if the images were generated with analog levels of light.

The pulse width modulator controls the operations of addressing the deformable mirror devices by formatting the data into "bit-planes" with each bit-plane corresponding to a bit weight of the intensity value. Therefore, if each pixel's intensity is represented by an n-bit value, each frame of data has n bit-planes. Each bit-plane has a 0 or 1 value for each display element. In the PWM control process each bit plane is separately loaded during a frame and the display elements are addressed according to their associated bit-plane values. For example, the bit-plane representing the LSBs of each pixel is displayed for 1 time slice.

FIG. 2 shows the light 24 is projected from the light source into the micromirror device 16. The micromirror device 16 shown in FIG. 2 includes a plurality of mirror elements 23, and the mirror elements 23 are arranged as a two-dimensional array. Each mirror element 23 is controllable to change the tilt of the mirror surface of a micromirror 21 based on a deflection axis 22 by applying a voltage to an address electrode. Thus, in the ON light state, the micromirror 21 is controlled to tilt to the deflection angle for reflecting the incident light along the direction for projecting images onto the screen.

On the other hand, in the OFF state, the micromirror 21 is controlled to tilt to the deflection angle for reflecting the incident light projecting along the optical path toward a light dump.

In a practical implementation, the size of each micromirror 21 shown in FIG. 2 is 11 μm. However, taking into account of current trends of technological developments, it is expected that a display system would be commonly implemented with a number of pixels of 1920×1080. In the meantime, a brighter light source such as a laser light source etc. starts to replace a high-pressure lamp to project illumination light with higher light intensities. With the implementation of the laser light source, the size of a 1920×1080 micromirror array can be reduced from the current diagonal of about 0.95 inch to 0.7 inch or 0.5 inch. The size of the projection device can be further miniaturized. Furthermore, the gray scale levels for modern image display system are further increased from the current 8 bits to 10 bits and even to a higher level of 16 bits.

However, with the above-mentioned developments and trends of the micromirror device used for image display, a micromirror is still limited by the restriction that the micromirrors are frequently controlled to deflect for projecting the light according to a dual control state as the ON light state or the OFF light state.

For example, when a micromirror device is used for a TV, a micromirror deflects hundreds of billion times to satisfy a durability requirement that the TV has a life time of at least five to ten years. Under that requirement, a micromirror is expected to touch and detach a micromirror stopper hundreds of billion times. It is therefore necessary to consider the improvement of the durability of the contact part between the micromirror and the stopper.

A mirror element typically implemented in a common micromirror device has a structure of supporting a micromirror formed by a reflection layer of aluminum, silver, etc. for reflection of incident light by an elastic hinge formed by amorphous silicon, polysilicon, ceramics, aluminum, etc. on a substrate. Each micromirror further includes at least one address electrode on the substrate below the micromirror. The elastic hinge can be a horizontal hinge of a twisted spring or a vertical hinge of a bent spring. Furthermore, the substrate is made of silicon, and an electric circuit etc. connected to an address electrode is formed in the substrate. On the substrate or the address electrode, an insulating layer can be laid using the material of $SiO_2$, $Al_2O_3$, TiN, a-Si, etc. on the substrate or the address electrode.

The micromirror device can be produced normally in a process similar to a semiconductor producing process. The manufacturing process mainly includes chemical vapor deposition (CVD), photolithography, etching, doping, chemical mechanical polishing (CMP), etc. Each mirror element of the micromirror device is controlled to deflect by a Coulomb force when a voltage is applied to the address electrode. The micromirror is controlled to deflect until it touches the insulating layer formed on the stopper or the address electrode fixed on the substrate.

The problem of stiction between the micromirror and the stopper on the substrate or the contact part of the insulating layer may occur when the micromirror contacts the stopper of the electrode. The stiction occurs due to the surface tension generated by the water content in the air condensed on the surface of the contact part on the substrate having affinity for water. Furthermore, the stiction can also occur due to the inter-molecule force, capillary force, electrostatic force, etc.

between the micromirror and the contact part on the substrate, etc. The occurrence of the stiction may cause a failure of control of a micromirror.

As a countermeasure to prevent the occurrences of the stiction, different configurations and methods are applied to reduce the surface energy or decrease the area of the contact part. Alternately, the antistiction may be implemented by suppressing the friction of the contacting surfaces between the micromirrors and the stopper or electrodes.

In practical implementation, the micromirror modulator is also necessary to enclose an inactive gas, for example, argon etc. in a package for protecting a micromirror device and to guarantee the air-tightness or preventing condensation due to a change of the temperature in the operational environment. For these reasons, the antistiction configurations often become more difficult to implement.

Various countermeasures described below have been devised to prevent the above-mentioned control failures due to the occurrences of stiction.

The U.S. Pat. No. 6,815,361 aims at preventing stiction by removing a sacrifice layer during the production of a MEMS device. The patented invention discloses a method of piling an antistiction layer composed of a polymer and polycrystal and processed by dry etching with a photoresist. Then, a sacrifice layer is laid over the layer, and the antistiction layer and the sacrifice layer are simultaneously processed. The processes proceed by applying a wet etch to remove the sacrifice layer with an HF solvent and the antistiction layer is removed by dry etching.

The United states patent application Publication No. 2004/0136044 discloses a technique of performing a surface stabilizing process or providing a lube layer to reduce the stiction between a static part and a deflection part in a microstructure device having the deflection part connected to the static part.

The U.S. Pat. No. 7,057,794 discloses a micromirror device having a multiplayer structure of mirrors. In the document, there is no description of stiction.

The U.S. Pat. No. 6,114,044 discloses the configuration of a film having low surface energy on the microstructure during the process based on a liquid. Specifically low surface energy film formed by a fluorinated self-structured monolayer is provided on a microstructure device. Thus, a capillary effect generated between the components of the microstructure device as a factor of stiction, and the viscosity between the surfaces of microstructures close to each other are reduced.

The U.S. Pat. Nos. 5,602,671 and 5,411,769 disclose the technology of forming an oriented monolayer of a long-chain aliphatic halogenated polar compound including a carboxyl base (—COOH) such as PFDA (perfluorodecanoic acid; $C_{10}HF_{19}O_2$) having high durability with reduced surface energy and friction coefficient to prevent the stiction caused by the force between molecules in the DMD. FIG. 3A shows a chemical formula of the PFDA. FIG. 3B is a schematic diagram of the contact part at the tips of an electrode 38 and a mirror 36 after forming an oriented monolayer of the PFDA.

The U.S. Pat. No. 5,576,878 discloses the technology of reducing the surface energy and friction using separate metals having low affinity for each other for two members contacting on a micromirror device to prevent stiction.

The United states patent application Publication No. 2004/0012061 discloses the technology of using silicide precursor, for example, a siloxane material, silane, and silanol having a completely or partially fluorinated circular structure as an antistiction material for preventing stiction.

The U.S. Pat. No. 5,447,600 discloses the technology of forming a protective layer of fluorinated polymer such as Teflon-AF (amorphous polymers) at a contact part of two members to prevent stiction on a microstructure device.

The U.S. Pat. No. 5,579,151 discloses the technology of preventing stiction by laying an inorganic layer of a solid lubricant of SiC, AlN, or $SiO_2$ at a contact part between an electrode of a reflector and a mirror in the spatial light modulation element including a reflector capable of being electrically charged and deflecting light. Especially, it discloses the technology of laying an inorganic surface stabilizer on a static member having a thickness of about 0.5 nm to 20 nm.

The U.S. Pat. No. 6,259,551 discloses the technology of forming a monolayer film of non-volatile molecules applied between monolayers at a contact part of two members of a microstructure device.

The U.S. Pat. No. 6,576,489 discloses the technology of coating by exposing a microstructure device to alkyl silane in a gaseous phase.

The U.S. Pat. No. 6,830,950 discloses the technology of preventing stiction by forming a hydrophobic self-structured monolayer using plasma on the surface of a MEMS device. A precursor forming a self-structured monolayer can be, for example, OTS (octadecyltrichlorosilane; $CH_3(CH_2)_{17}SiCl_3$) or FDTS (perfluorodecyltrichlorosilane; $CF_3(CF_2)_7(CH_2)_2SiCl_3$). FIG. 4B shows the process of forming the FDTS of the self-structured monolayer on the surface of the MEMS device.

The U.S. Pat. No. 5,523,878 discloses the technology of covering the contact part of the microstructure device with a monomolecule using the liquid phase growth of the self-structured monolayer or the precursor. It specifically discloses an example of covering the surface of the contact part with the material of metal or aluminum oxide.

As described above, the technical difficulties of stiction are more serious in a micromirror device implemented with large number of micromirrors. There is an urgent demand to resolve the difficulties such that the image display systems implemented with micromirror devices overcome such technical problems to provide display images with improved quality.

SUMMARY OF THE INVENTION

The first aspect of the present invention provides a micromirror device formed on a substrate supporting an elastic hinge for connection and supporting a mirror on the substrate. The mirror device further includes an address electrode for receiving control signals for deflecting the mirror, and a stopper for determining the maximum deflection angles of the mirror. A protective layer is formed on the substrate to cover at least the stopper functioning also the address electrode provided between a portion below the mirror and the substrate, and an oriented monolayer above the protective layer are laid.

The second aspect of the present invention provides a micromirror device formed on a substrate supporting an elastic hinge for connection supporting a mirror on the substrate. The mirror device further includes an address electrode for receiving signals for deflecting the mirror, and a stopper for determining the maximum deflection angles of the mirror. A protective layer including a silicon material covers a stopper arranged closer with respect to a deflection axis of the mirror than the center of the address electrode on the substrate and the stopper, and an oriented monolayer is formed as the protective layer.

The third aspect of the present invention provides a micromirror device including an elastic hinge for connection and supporting a mirror on a substrate, and a stopper for determining the maximum deflection angles of the mirror. One side of the substantially square mirror is about 11 μm or less, the gap between the mirror and an adjacent mirror is 0.55 μm or less, the distance between the lower bottom surface of the mirror and the stopper is 1 μm or less, and an oriented monolayer having the number of fluorinated carbon is 6 or less is deposited on the mirror, the elastic hinge, and the stopper.

The fourth aspect of the present invention provides a micromirror device including an elastic hinge composed of a silicon material for supporting a mirror on a substrate, an address electrode for deflecting the mirror, and a stopper for determining the maximum deflection angles of the mirror. The stopper is provided between the portion below the mirror and the substrate, and an oriented monolayer is deposited in the gap between the elastic hinge and the stopper, or the gap between the mirror and also deposited on the stopper that is equal to or smaller than the gap between the mirror and the address electrode, wherein the number of carbon fluorinated by the mirror, the elastic hinge, and the stopper is 6 or less.

The fifth aspect of the present invention provides a micromirror device including an elastic hinge for supporting a mirror on a substrate, and an address electrode for deflecting the mirror. The address electrode is provided on the substrate, a protective layer can be provided on the address electrode, and an oriented monolayer in which the number of fluorinated carbon laid in a gaseous phase state is 6 or less is arranged in any of the mirror, the elastic hinge, and the protective layer.

The sixth aspect of the present invention provides a micromirror device including a stopper for determining the maximum deflection angles of a mirror on a substrate. A protective layer made of an oxide to cover at least the stopper is laid on the substrate, and an oriented monolayer is laid on the protective layer in a gaseous phase state under a normal temperature and a reduced pressure.

The seventh aspect of the present invention provides a micromirror device including an elastic hinge for supporting a mirror on a substrate, and an address electrode for deflecting the mirror. The address electrode generates Coulomb force different from that of the mirror depending on the direction of deflection of the mirror, a protective layer can be laid on the address electrode, and at least an oriented monolayer laid on the address electrode in a gaseous phase state is arranged.

The eighth aspect of the present invention provides a micromirror device including an elastic hinge for supporting a mirror on a substrate. The device further includes at least a mirror array in which the gap between a mirror and an adjacent mirror is 0.55 μm or less, a stopper for determining the maximum deflection angles of a plurality of mirrors, an elastic hinge which is enclosed by a plurality of stoppers and is wider than the gap, and a stopper having an oriented monolayer laid through the gap.

The ninth aspect of the present invention provides the micromirror device according to the first through eighth aspects in which the oriented monolayer includes a halogenated alkyl silicide or an alkyl silicide.

The tenth aspect of the present invention provides the micromirror device according to the first through eighth aspects in which all or a part of hydrogen-H coupled to a carbon chain portion of the molecule having a carbon chain for forming an oriented monolayer is replaced with halogen.

The eleventh aspect of the present invention provides the micromirror device according to the first through eighth aspects in which the carbon chain portion of the molecule having a carbon chain for forming an oriented monolayer makes saturated or unsaturated carbon coupling, and all or a part of hydrogen-H coupled to the carbon chain portion is replaced with halogen.

The twelfth aspect of the present invention provides the micromirror device according to the first through eighth aspects in which the oriented monolayer includes a halogenated alkyl silicide or an alkyl silicide, and is made of two or more compounds having different number of carbon or halogen.

The thirteenth aspect of the present invention provides the micromirror device according to the first through eighth aspects in which the oriented monolayer includes a halogenated alkyl silicide or an alkyl silicide, and is made of two or more compounds having different number of at least carbon.

The fourteenth aspect of the present invention provides the micromirror device according to the first through eighth aspects in which the oriented monolayer is made of the material of $CF_3(CF_2)_x(CH_2)_ySi(CH_3)_nCl_{3-n}(0 \leq n \leq 2)$.

The fifteenth aspect of the present invention provides the micromirror device according to the first through eighth aspect in which the oriented monolayer is configured by combining any one or two or more of perfluorodecyltrichlorosilane, dichlorodimethylsilane, vinyl trimethoxy silane, octadecyltrichlorosinan, undecenyltrichlorosilane, decyltrichlorosilane, fluorooctatrichlorosilane, perfluorodecyldimethylchlorosilane, and perfluorooctyldimethylchlorosilane.

The sixteenth aspect of the present invention provides the micromirror device according to the first through eighth aspects in which the number of the fluorinated carbon of the molecule configuring the oriented monolayer is 6 or less.

The seventeenth aspect of the present invention provides the micromirror device according to the first through eighth aspects in which the elastic hinge includes a silicon material, and a material of one of As, P, Ge, and Ni is doped or spread.

The eighteenth aspect of the present invention provides the micromirror device according to the first through eighth aspects in which the protective layer is SiC, amorphous silicon, or polysilicon.

The nineteenth aspect of the present invention provides the micromirror device according to the first through eighth aspects in which the protective layer is SiC, amorphous silicon, or polysilicon, and further includes a combination of oxygen and silicon, that is, —Si—O—.

The twentieth aspect of the present invention provides the micromirror device according to the first through eighth aspects in which the oriented monolayer is laid also on the side of the substrate.

The twenty-first aspect of the present invention provides the micromirror device according to the first through eighth aspects in which the oriented monolayer is configured by laying a plurality of monolayers.

The twenty-second aspect of the present invention provides the micromirror device according to the first through eighth aspects in which the oriented monolayer is configured by laying a plurality of monolayers, the end portion coupled to the substrate of the material of the first layer is halogenated silane, and the other end portion has any of hydrogen, hydroxyl, and carboxyl.

The twenty-third aspect of the present invention provides the micromirror device according to the first through eighth aspects in which the oriented monolayer is configured by laying a plurality of monolayers, the first and second layers are made of different materials, the end portion of the material of the second layer coupled to the oriented monolayer film of the first layer is halogenated silane or carboxyl, and the other end portion is —$CF_3$.

The twenty-fourth aspect of the present invention provides the micromirror device according to the first through eighth aspects in which the oriented monolayer is configured by laying a plurality of monolayers, the end portion of the oriented monolayer of the first layer is alkyl silicide, and the other end portion is hydrogen or halogenated carbon as hydroxyl.

The twenty-fifth aspect of the present invention provides the micromirror device according to the first through eighth aspects in which the oriented monolayer is configured by laying a plurality of monolayers, the first and second layers are configured by different materials, the second layer is made of the material of $CF_3(CF_2)_x(CH_2)_ySi(CH_3)_nCl_3$ ($0 \leq n \leq 2$).

The twenty-sixth aspect of the present invention provides the micromirror device according to the first through eighth aspects in which the oriented monolayer is laid under a normal temperature and a reduced pressure.

The twenty-seventh aspect of the present invention provides the micromirror device according to the first through eighth aspects in which the mirror line-contacts a point of the stopper or point-contacts each of at least two points of the stopper.

The twenty-eighth aspect of the present invention provides the micromirror device according to the first through eighth aspects in which Coulomb force is generated between the address electrode and the mirror unit in the non-deflected direction while the mirror is deflected in a predetermined direction.

The twenty-ninth aspect of the present invention provides the micromirror device according to the first through eighth aspects in which the Coulomb force between the mirror and the address electrode is reduced while the mirror is deflected in a predetermined direction.

The thirtieth aspect of the present invention provides a projection device provided with a micromirror device including a mirror capable of deflecting and holding angles at which at least two optical state, that is, an ON light state in which incident light is reflected toward a projected light path and an OFF light state in which the incident light is reflected in the direction other than the projected light path, a deformable elastic hinge for supporting the mirror arranged on the substrate, an address electrode for providing Coulomb force for deflecting the mirror arranged on the substrate below the mirror, a stopper regulating the deflection angle of the mirror, and a drive circuit for providing a potential difference between the mirror formed on the substrate and the address electrode. With the configuration, the stopper includes a protective layer having Si, and one or two or more layers of oriented monolayers including the molecules having the number of halogenated carbon of 6 or less.

The thirty-first aspect of the present invention provides a projection device provided with a micromirror device including a mirror capable of deflecting and holding angles at which at least two optical state, that is, an ON light state in which incident light is reflected toward a projected light path and an OFF light state in which the incident light is reflected in the direction other than the projected light path, a deformable elastic hinge for supporting the mirror arranged on the substrate, an address electrode for providing Coulomb force for deflecting the mirror arranged on the substrate below the mirror, a stopper regulating the deflection angle of the mirror, and a drive circuit for providing a potential difference between the mirror formed on the substrate and the address electrode. With the configuration, the gap between adjacent mirrors is 0.55 μm or less, the distance between the lower bottom surface and the stopper is smaller than the length of the elastic hinge, and an oriented monolayer is laid on the address electrode or the stopper and the bottom surface of the mirror.

The thirty-second aspect of the present invention provides a projection device provided with a micromirror device including a mirror capable of deflecting and holding an angle at which at least two optical state, that is, an ON light state in which incident light alternately emitted from a laser light source of a plurality of colors is reflected toward a projected light path and an OFF light state in which the incident light is reflected in the direction other than the projected light path, a deformable elastic hinge for supporting the mirror arranged on the substrate, an address electrode for providing Coulomb force for deflecting the mirror arranged on the substrate below the mirror, and a drive circuit for providing a potential difference according to a video signal of a given bit between the mirror and the address electrode formed on the substrate. With the configuration, the incident light of at least one color is emitted with pulses of a frequency of deflection in the ON light state and the OFF light state higher than the frequency of the number of given bits in one frame, and an oriented monolayer is provided at a contact part in the deflection state of the mirror.

The thirty-third aspect of the present invention provides a projection device provided with a micromirror device including a mirror capable of deflecting and holding angles at which at least two optical state, that is, an ON light state in which incident light from a laser light source is reflected toward a projected light path and an OFF light state in which the incident light is reflected in the direction other than the projected light path, a deformable elastic hinge for supporting the mirror arranged on the substrate, an address electrode for providing Coulomb force for deflecting the mirror arranged on the substrate below the mirror, and a drive circuit for providing a potential difference between the mirror and the address electrode formed on the substrate. One side of the mirror is 10 μm or less, the deflection angle between the ON light state and the OFF light state of the mirror is 20° or less, and an oriented monolayer is provided for a contact part in the deflection state of the mirror.

The thirty-fourth aspect of the present invention provides the projection device according to the thirtieth through thirty-third aspects in which the mirror continuously repeats free oscillation between the ON light state and the OFF light state, thereby maintaining the free oscillation state in which the integration value of the quantity of light reflected toward the projected light path is made lower than the ON light, and preventing the mirror from contacting the stopper in at least one period in the free oscillation state.

The thirty-fifth aspect of the present invention provides the projection device according to the thirtieth through thirty-third aspects in which the micromirror device is configured by a mirror array provided with about two millions of pixels of substantially square mirrors, the surface of the mirror has an aluminum or silver reflection surface, and the thickness of the reflection surface is 2000 Å or less.

The thirty-sixth aspect of the present invention provides the projection device according to the thirtieth through thirty-third aspects in which the effective length of the substantially perpendicular elastic hinge of the micromirror device is 1 μm or less.

The thirty-seventh aspect of the present invention provides the projection device according to the thirtieth through thirty-third aspects in which the voltage for deflection control of the mirror or the voltage for holding the mirror at the stopper is 15V or less.

The thirty-eighth aspect of the present invention provides the projection device according to the thirtieth through thirty-third aspects in which the oriented monolayer is made of the material of $CF_3(CF_2)_x(CH_2)_ySi(CH_3)_nCl_{3-n}$ ($0 \leq n \leq 2$).

The thirty-ninth aspect of the present invention provides the projection device according to the thirtieth through thirty-third aspects in which the molecule configuring the oriented monolayer includes the number of halogenated carbon of 6 or less.

The fortieth aspect of the present invention provides the projection device according to the thirtieth through thirty-third aspects in which the molecule configuring the oriented monolayer includes the number of halogenated carbon of 6 or less, and is laid under the normal temperature and a reduced pressure in the gaseous phase state.

The forty-first aspect of the present invention provides the projection device according to the thirtieth through thirty-second aspects in which the light source of the incident light is a semiconductor laser light source, and the F Number of the projection lens is 3.5 or more.

The forty-second aspect of the present invention provides the projection device according to the thirtieth through thirty-second aspects in which the light source of the incident light is a semiconductor laser light source, the deflection angle between the substantially horizontal state of the mirror and the ON light state or the substantially horizontal state of the mirror and the OFF light state is 18° or less, and the deflection angles of the ON light state and the OFF light state are substantially the same.

The forty-third aspect of the present invention provides the projection device according to the thirtieth through thirty-second aspects in which the light source of the incident light is a semiconductor laser light source, the deflection angle between the substantially horizontal state of the mirror and the ON light state or the substantially horizontal state of the mirror and the OFF light state is 15° or less, and the deflection angles of the ON light state and the OFF light state are different from each other.

The forty-fourth aspect of the present invention provides the projection device according to the thirtieth through thirty-third aspects in which the mirror has at least two states, that is, the ON light state and the OFF light state, the area or the position of the address electrode is different between the ON light state and the OFF light state.

The forty-fifth aspect of the present invention provides the projection device according to the thirtieth through thirty-third aspects in which the mirror has at least three states, that is, the ON light state, the OFF light state, and the oscillation state, and a voltage lower than the voltage held at the stopper or 0V is applied in the oscillation state in the ON light state or the OFF light state of the mirror.

The forty-sixth aspect of the present invention provides the projection device according to the thirtieth through thirty-third aspects in which the deflection angles of the mirror from the horizontal state are different between the ON light state and the OFF light state.

The forty-seventh aspect of the present invention provides the projection device according to the thirtieth through thirty-third aspects in which the deflection angle of the mirror in the ON light state is 12° to 8° from the horizontal state of the mirror.

The forty-eighth aspect of the present invention provides the projection device according to the thirtieth through thirty-third aspects in which the deflection angle of the mirror in the ON light state is 8° to 4° from the horizontal state of the mirror.

The forty-ninth aspect of the present invention provides the projection device according to the thirtieth through thirty-third aspects in which one of the Coulomb force for holding the mirror in the ON light state and the Coulomb force for holding the mirror in the OFF light state is lower than the other.

The fiftieth aspect of the present invention provides the projection device according to the thirtieth through thirty-third aspects in which one side of the mirror is 7 μm or less, and the gap from an adjacent mirror is 0.4μ or less.

The fifty-first aspect of the present invention provides the projection device according to the thirtieth through thirty-third aspects in which the oriented monolayer is laid without heating the substrate or the chamber.

The fifty-second aspect of the present invention provides the projection device according to the thirtieth through thirty-third aspects in which the elastic hinge is a torsion spring arranged substantially horizontally to the mirror.

The fifty-third aspect of the present invention provides the projection device according to the thirtieth through thirty-third aspects in which the elastic hinge is a bent spring arranged substantially perpendicularly to the mirror.

These and other aspects, objects and advantages of the present invention will no doubt become obvious to those of ordinary skill in the art after having read the following detailed description of the preferred embodiment, which is illustrated in the various drawing figures.

BRIEF DESCRIPTION OF THE DRAWINGS

FIG. 1A includes a functional block diagram for showing a conventional projection display using a micromirror device;

FIG. 1B shows a top view of micromirror elements for illustrating the basic principle of a micromirror device used for a projection display;

FIG. 5A is a top view of one mirror element shown in FIG. 2;

FIG. 5B is a side cross sectional view of one mirror element shown in FIG. 5A;

DESCRIPTION OF THE PREFERRED EMBODIMENTS

Figure 1C:
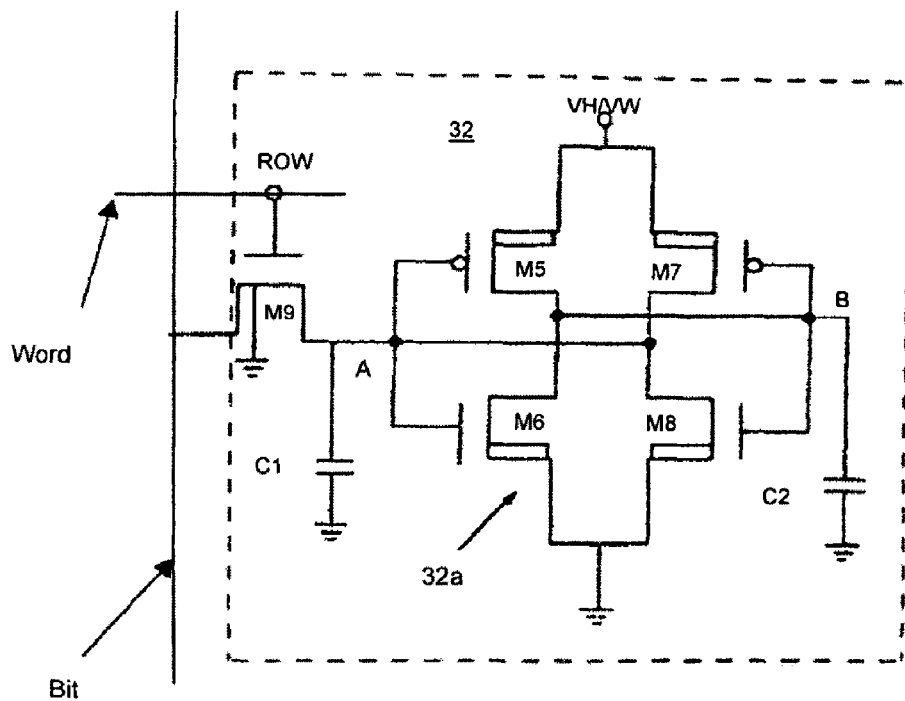
FIG. 1C is a circuit diagram that shows an example of the driving circuit of prior arts.
Figure 1D:
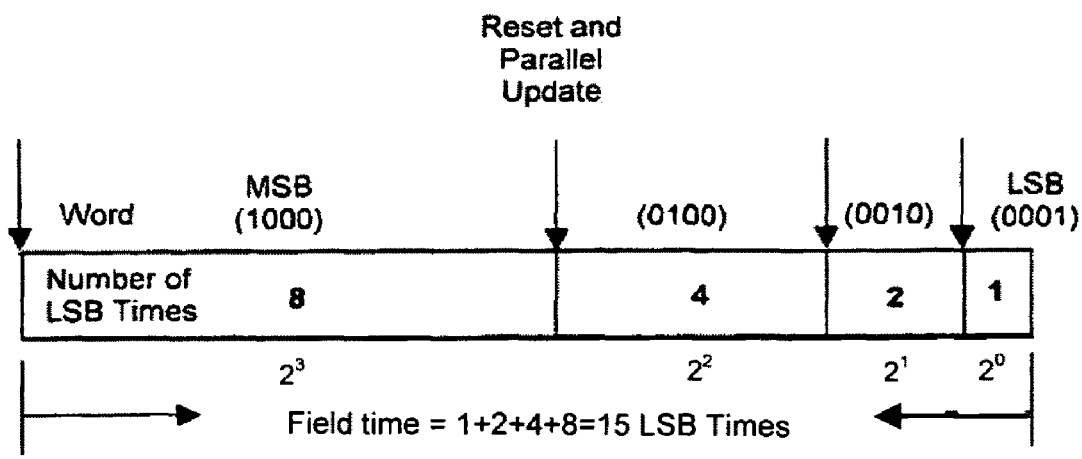
FIG. 1D is a timing diagram that shows the scheme of Binary Pulse Width Modulation (Binary PWM) of conventional digital micromirrors to generate grayscale.

The present invention provides a micromirror device implemented with an antistiction layer. The anti-sticition layer is to prevent stiction between the micromirror and the stopper on the substrate or the micromirror and the protective layer on the address electrode in each mirror element.

In an exemplary embodiment, an oriented monolayer is laid on the micromirror device as an antistiction layer for preventing the stiction. A method of laying the oriented monolayer is carried out by forming a vaporized oriented monolayer on each mirror array of a wafer followed by dicing the micromirror device in the chamber. The average movement energy of a gaseous molecule having a mass m a can be represented by the following equation (1) as the vaporized molecule undergoes a process at certain temperature T.

$$\frac{1}{2}mv^2 = \frac{3}{2}kT \tag{1}$$

Where m in the right side is a mass of the gaseous molecule, v represents an average speed of the gaseous molecule and k in the left side represents a Boltzmann constant ($k=1.38 \times 10^{-23} JK^{-1}$), and T represents an absolute temperature.

Based equation (1), when the absolute temperature T is constant, the product of the mass m and the square of the average speed v of the gaseous molecule, that is, $mv^2$, is constant. According to equation (1), the average speed v of the gaseous molecule is obtained as follows.

$$v = \sqrt{\frac{3kT}{m}} = \sqrt{\frac{3RT}{M}} \tag{2}$$

Where R represents a gas constant ($R=8.31\ Jmol^{-1}K^{-1}$), and M represents the molecular weight of the gas.

Therefore, a vaporized molecule moves at a higher speed with a higher absolute temperature T¥. Under a constant absolute temperature, a vaporized molecule with smaller mass M moves at a higher speed. Therefore, the speed of spreading a film on a surface is increased under t a constant absolute temperature T is increased with the film comprises gaseous molecules of smaller molecular weight M. The time required to spread a film on a surface is therefore shortened when a film of smaller molecular weight is applied.

In exemplary embodiments of this invention, the molecular weights of gaseous molecules applied for spreading a film on a surface may include molecular weight of 482 g/mol for perfluoroocrylrichlorosilane ($CF_3(CF_2)_5(CH_2)_2SiCl_3$; PFOTS), 384 g/mol for perfluoroocryldimethylchlorosilane ($CF_3(CF_2)_2(CH_2)_2Si(CH_3)_2Cl$; PFODSC), 484 g/mol for perfluorodecyldimethylchlorosilane ($CF_3(CF_2)_7(CH_2)_2Si(CH_3)_2Cl$; PFDDCS), and 129 g/mol for dichlorodimethylsilane ($(CH_3)_2SiCl_2$; DDS).

When N gaseous molecules are contained in the box having the volume of V, the average value of the distance of the moving gas per molecule, that is, a mean free path L, is expressed as follows.

$$L = \frac{V}{4\pi a^2 N} \tag{3}$$

Where a represents a radius of one gaseous molecule.

Therefore, based on the equation (3), the mean free path L of the gaseous molecules depends on the molecule number density V/N and the surface area $4\pi a^2$ of the molecule. The smaller the radius of one gaseous molecule, i.e., a, the longer is the mean free path L of the gas. Therefore, when a film is applied to spread on the surface of a device manufactured by MEMS technology with minute and complicated MEMS structural features, it is advantageous to apply a gaseous molecule with small radius when different gaseous molecules have about the same density. Depending on the selected molecule, a film with improved film integrity is formed by heating the film and performing an annealing process in the process of spreading the film. Furthermore, a film can be successfully generated by laying a monolayer at a normal temperature or with a reduced pressure at a normal temperature.

Figure 5C:
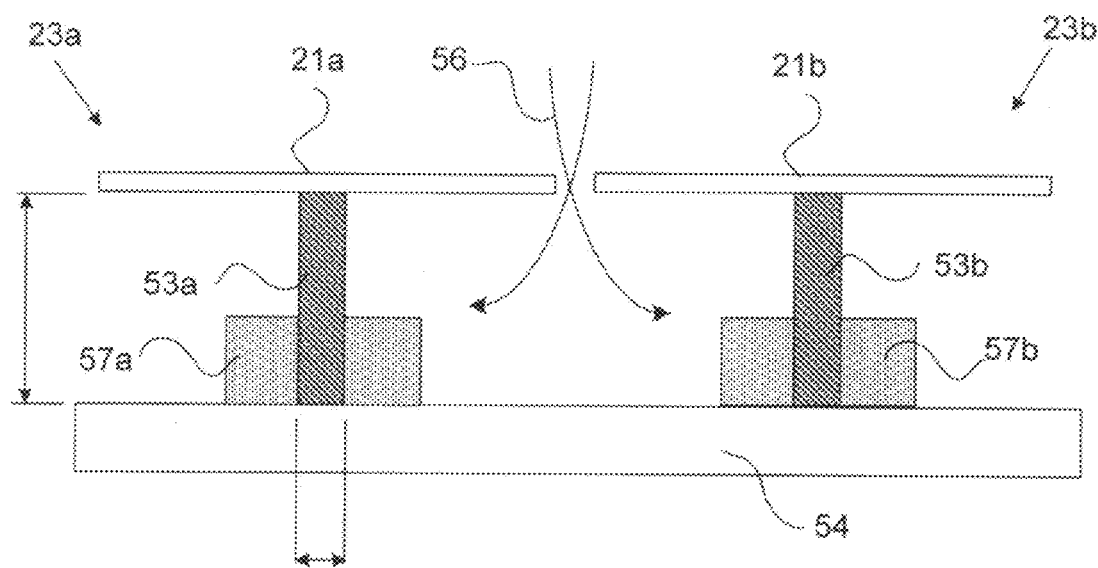
FIG. 5C is a schematic diagram for illustrating the processes of forming an oriented monolayer in each member through a gap between adjacent mirror elements.

FIGS. 5A through 5C are schematic diagrams to illustrate the processes of applying the flow of the vaporized molecules to lay an oriented monolayer. The oriented monolayer is applied to prevent stiction. The stiction may occur on the reverse side of the reflection surface of a micromirror one of the mirror element of the micromirror device. The oriented monolayer is to prevent the stiction between the lower surface of the micromirror and the surface of the stopper supported on the substrate.

Figure 2:
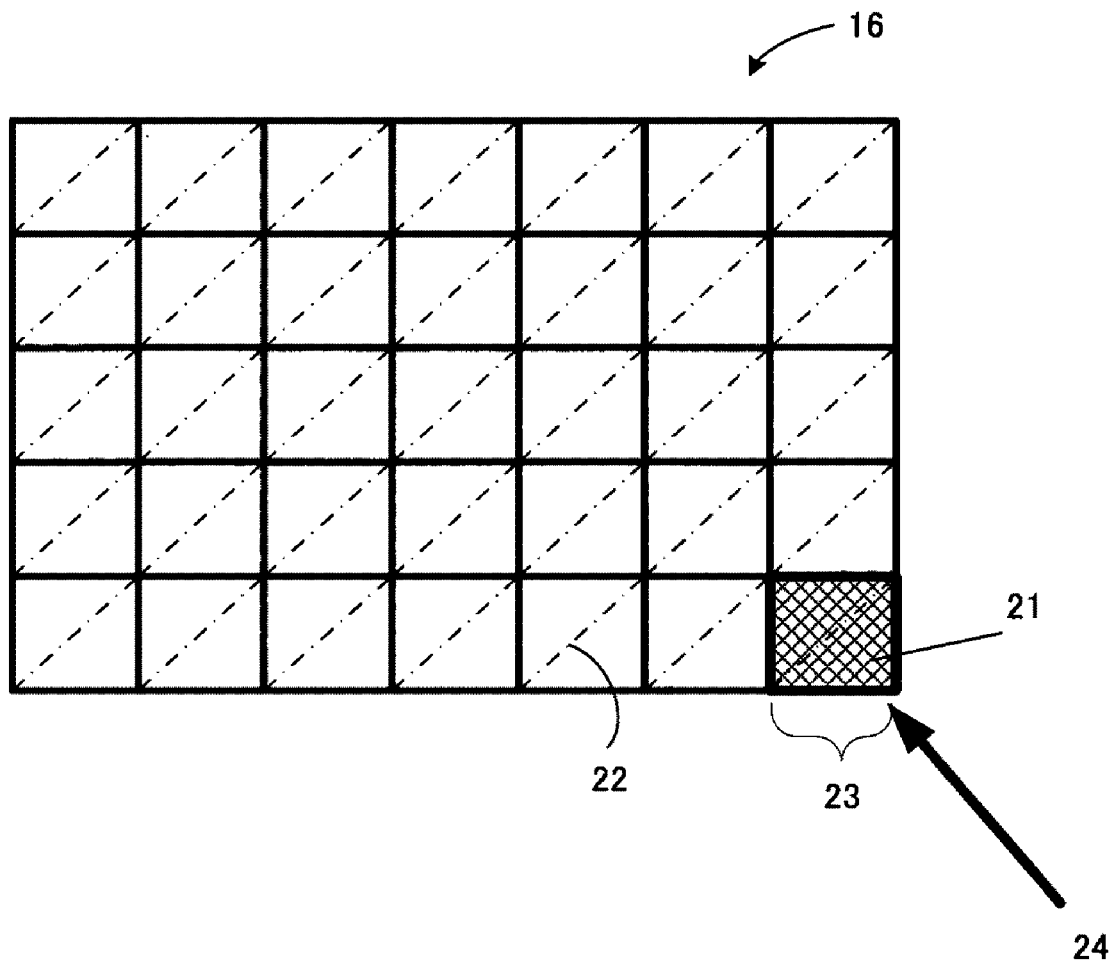
FIG. 2 is a perspective view for showing the light incoming from the light source to the micromirror device.
Figure 3A:
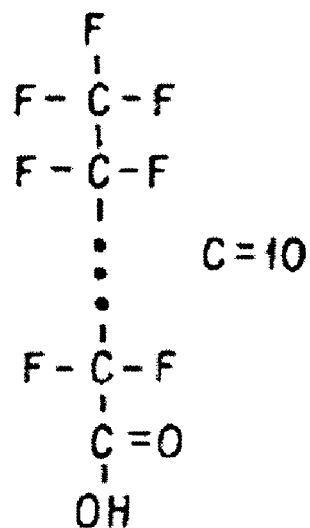
FIG. 3A shows a chemical formula of the PFDA (perfluorodecanoic acid; $C_{10}HF_{19}O_2$)
Figure 3B:
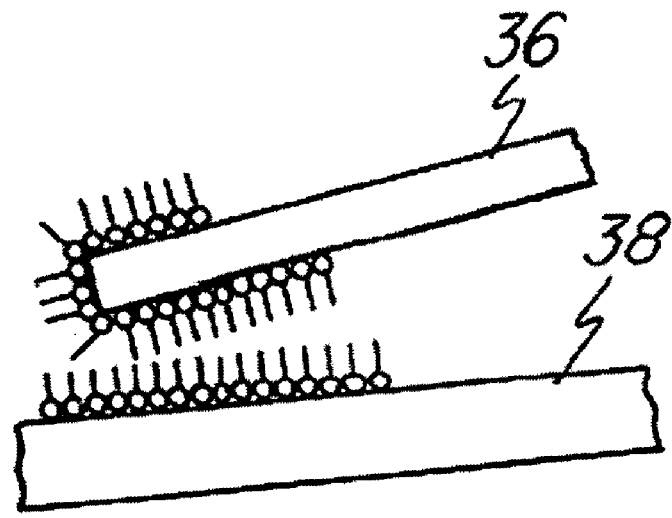
FIG. 3B is a schematic diagram for illustrating the configuration of the contact part between the electrode and the tip of the mirror after forming the oriented monolayer of the PFDA.
Figure 4A:
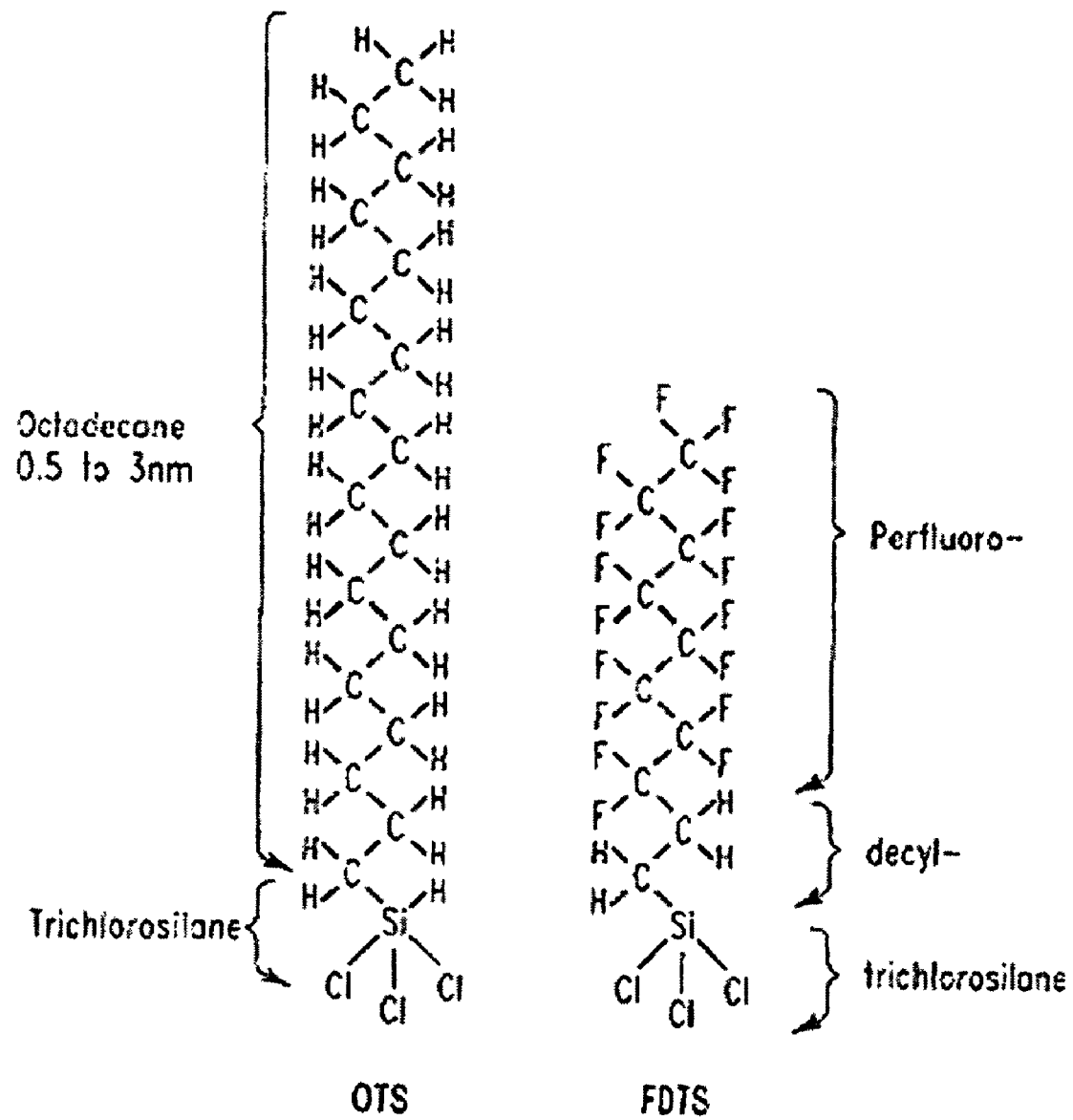
FIG. 4A shows chemical formulae of the OTS (octadecyltrichlorosilane; $CH_3(CH_2)_{17}SiCl_3$) and the FDTS (perfluorodecyltrichlorosilane; $CF_3(CF_2)_7(CH_2)_2SiCl_3$)
Figure 4B:
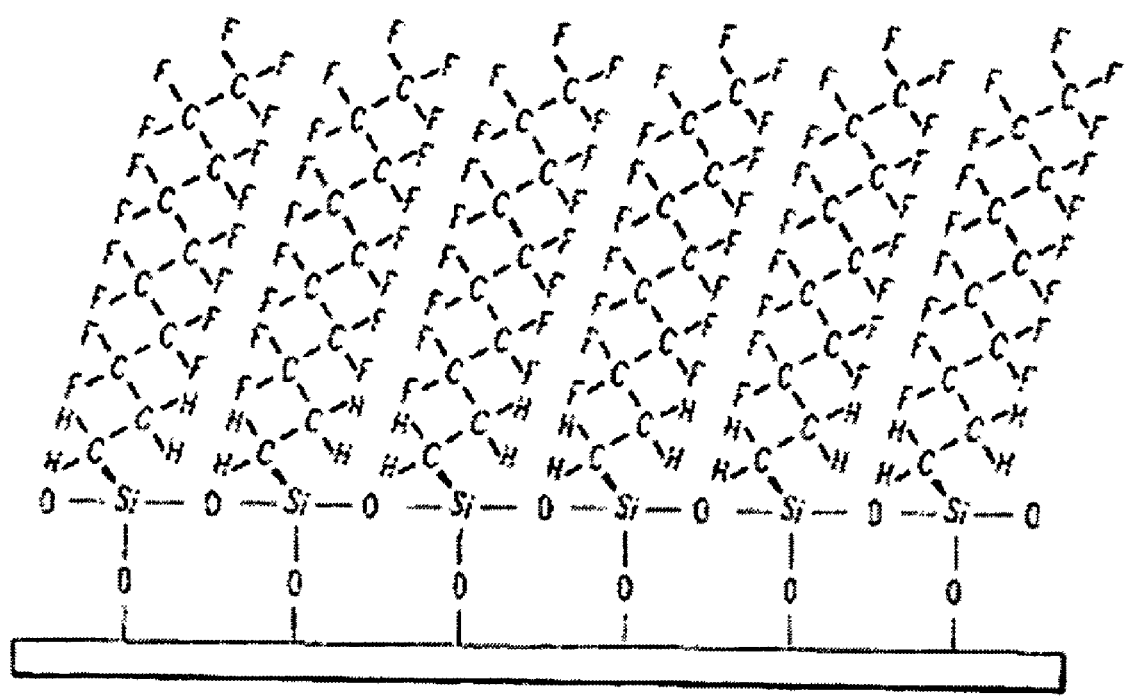
FIG. 4B is a schematic diagram for illustrating the processes of forming an: FDTS of the self-structured monolayer on the surface of the MEMS device.

FIG. 5A is a top view of a mirror element 23 arranged in a two-dimensional array of the micromirror device as shown in FIG. 2. FIG. 5A shows only one micromirror 21, an elastic hinge 53, and two address electrodes 52*a* and 52*b* as stopper portions. FIG. 5B is a side cross sectional view of FIG. 5A. FIG. 5B shows only the micromirror 21, the elastic hinge 53, two address electrodes 52*a* and 52*b*, and a substrate 54. A vaporized molecule can have an oriented monolayer formed on each of the address electrodes 52*a* and 52*b*, the elastic hinge 53, and the surface of the reverse side of the reflecting surface of the mirror. FIG. 5C is a schematic diagram for illustrating the processes of forming an oriented monolayer for each member through a gap between micromirrors 21*a* and 21*b* of adjacent mirror elements 23*a* and 23*b* in the micromirror device. In this example, control of deflection of the micromirrors 21*a* and 21*b* of the mirror elements 23*a* and 23*b* is performed by address electrodes 57*a* and 57*b*. The address electrodes also function as stoppers for limiting the tilt angle of the deflectable mirrors.

The vaporized mono-molecule forms an oriented monolayer on the surfaces of the address electrodes 57*a* and 57*b*, the elastic hinges 53*a* and 53*b*, and the surface of the reverse side of the mirror reflecting surface through the gap between the micromirrors 21*a* and 21*b* of each mirror element by a flow 56 of the gas shown in FIG. 5C.

Therefore, a gas flow that has a small gaseous molecule with a small radius, i.e., radius a is selected. The molecules with small radius can easily enter the gap between adjacent micromirrors, thereby more quickly spreading an oriented monolayer on the surfaces of the stoppers and the surface on the reverse side of the reflecting surface of the micromirror.

FIGS. 6A through 6D show the detailed layer structures of one mirror element provided with an antistiction layer formed according to the processing steps shown in FIGS. 5A and 5B.

The micromirror 21 that includes a plurality of mirror elements 23 shown in FIGS. 6A through 6D wherein the micromirror is substantially square having a side of 4 μm through 14 μm. The micromirror 21 includes an upper layer functioning as a reflecting layer 66 (for example, an aluminum layer) for efficiently reflecting light. The micromirror further includes an intermediate layer of a support plate layer (for example, a layer of titanium, tungsten, etc.) for supporting the aluminum layer, and a lower layer of a layer 65 formed with a silicon as the same material for forming the elastic hinge 53.

The layer structure and materials implemented to form the micromirrors may have different optional selections. The mirror surface may be composed of a bimetal layer obtained by laying an aluminum layer, a silicon layer, an aluminum layer, etc. in this order. The mirror surface may also a double layer structure of aluminum and silicon only. The aluminum layer can basically reflect 80% or more of the visible light with the thickness of 1000 Å or less. In addition, the specific speed of oscillation in the free oscillation state of the mirror can be determined as described later by adjusting the aluminum layer to a range of thickness between 1000 Å to 3000 Å to produce a predetermined weight of mirror.

The micromirror 21 of the mirror element 23 is arranged with a gap of about 0.09 μm through 0.55 μm from the adjacent micromirror 21. The dimension of the mirrors and the gaps between the mirrors are controlled to prevent collisions with adjacent micromirrors when multiple mirrors are control to simultaneously deflect and oscillate. The elastic hinge 53 is coupled to a wiring layer (not shown) and extending perpendicularly with respect to the substrate surface. The hinge 53 is formed on the substrate of a micromirror device, and is coupled to the layer 65 composed of a silicon material that is the same as the bottom layer of the micromirror.

The elastic hinge 53 is formed with a silicon material such as amorphous silicon, polysilicon, monocrystal silicon, etc. The width of the elastic hinge 53 is in a range between 0.5 μm to 1.2 μm, and the length is between 0.5 μm to 1.5 μm. The width and length of the hinge guarantee the durability of the hinge to allow for the mirror to deflect and oscillate at a wide range of frequencies. Furthermore, instead of a single hinge configuration, two narrow elastic hinges can be applied. The elastic hinge can be a torsion spring arranged substantially horizontally to the micromirror 21.

In addition to the silicon material applied for forming the micromirror 21 or the elastic hinge 53, additional materials may include arsenic, boron and phosphorus. By doping Si of the silicon material with arsenic, boron and phosphorus, the conductivity of the doped silicon thus allows the transmission of electrons from the micromirror 21 to the address electrodes 52*a* and 52*b* when a voltage is applied.

The Si may be doped by implanting arsenic, boron and phosphorus ions into the silicon substrate or by applying an in-site doping process. In addition to arsenic, boron and phosphorus, conductive materials such as germanium, nickel, etc. can also spread on to the elastic hinge for providing conductivity to the elastic hinge made of semiconductor material.

In the surface of the substrate around the area where the micromirror device is coupled to the elastic hinge 53, the drive circuit (not shown) is connected through a via to the address electrodes 52*a* and 52*b* for receiving signals to control the deflection of the micromirror.

The substrate 54 shown as the bottom layer has a metal layer 62 covered thereon. An oxide layer 63 covers over the metal layer 62. The address electrodes 52*a* and 52*b* and a stopper, etc. are formed on top of the oxidation layer 63. The address electrodes 52*a* and 52*b* may also implemented to function as a stopper. The mirror is controlled by applying voltages to the address electrodes 52*a* and 52*b* for generating Coulomb forces between the address electrodes 52*a* and 52*b* and the micromirror 21 for controlling and deflecting and the micromirror 21 different tilt angles.

Furthermore, a protective layer 64 formed with a silicon material as an insulating layer covers over the surface of the address electrodes 52*a* and 52*b*. The protective layer 64 comes into contact with the layer 65 on the bottom surface of the micromirror 21 when the micromirror is deflected to one of the address electrodes. In an exemplary embodiment, the protective layer 64 is a layer composed of SiC or amorphous silicon, and polysilicon. By adding oxygen to the amorphous silicon or polysilicon as the protective layer 64, a Si—O-coupling occurs, the electric resistance value increases, and the insulation can be enhanced.

The distance between the address electrodes 52*a* and 52*b* and the length and height of the micromirror 21 are designed to allow for the mirror to deflect to specific deflection angle. The Coulomb force working between the micromirror 21 and the address electrodes 52*a* and 52*b* can be adjusted by appropriately adjusting the distance between the address electrodes 52*a* and 52*b* and the micromirror 21, and the area of the address electrodes 52*a* and 52*b*. Application of the Coulomb force for deforming the elastic hinge 53 that supports the micromirror 21 is necessary to carry out the light modulation function of the micromirror device.

Figure 6A:
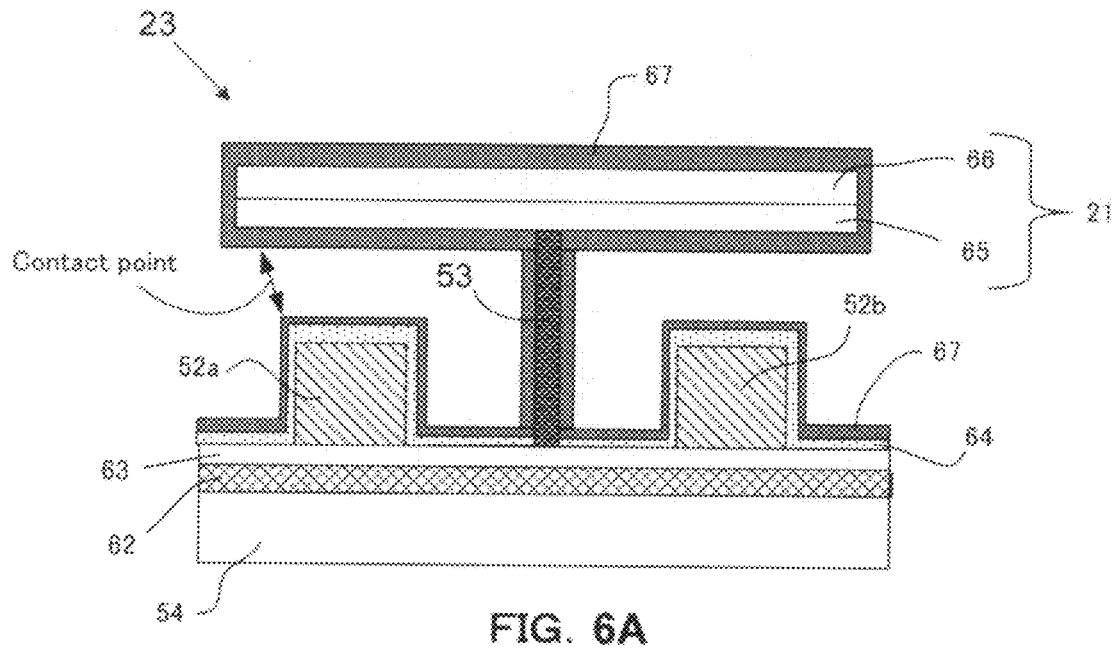
FIG. 6A a side cross sectional view that shows one mirror element in which a micromirror including al oriented monolayer contacts an address electrode.

FIG. 6A shows an example of a mirror element in which the micromirror 21 is control to tilt and contact the address electrodes 52a and 52b functioning as a stopper by applying a voltage to the address electrodes 52a and 52b.

When address electrodes 52a and 52b functioning also as a stopper portion, the deflection angle of the micromirror 21 can be determined based on an angular position of the micromirror 21 where the micromirror 21 touches the upper portions of the address electrodes 52a and 52b.

Figure 6B:
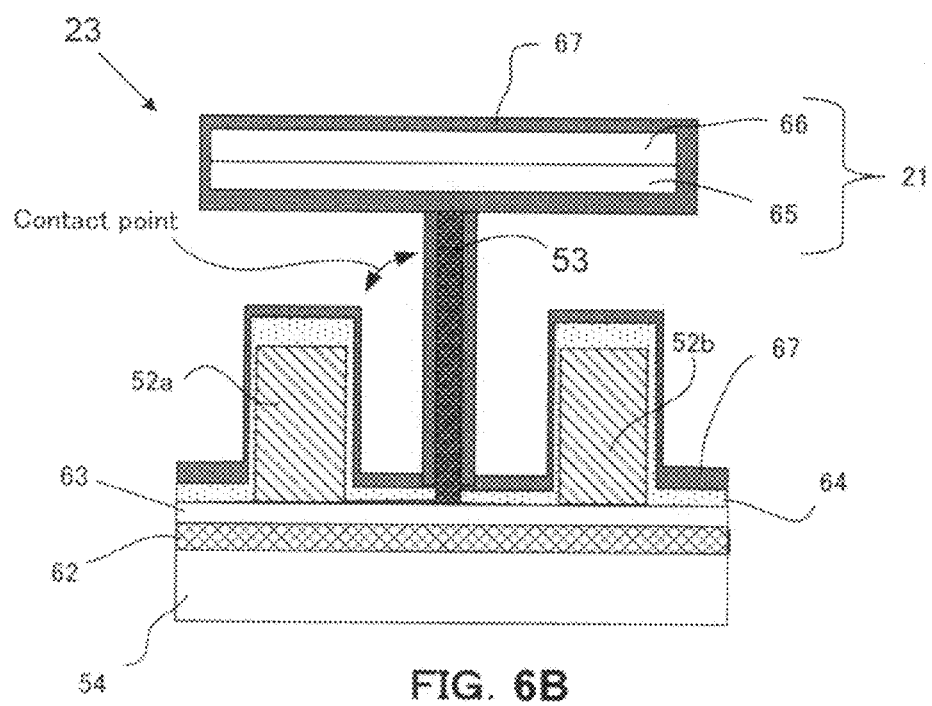
FIG. 6B a side cross sectional view that shows one mirror element in which an elastic hinge including an oriented monolayer contacts an address electrode.

FIG. 6B shows an example of a mirror element in which the elastic hinge 53 touches the address electrodes 52a and 52b by applying a voltage to the address electrodes 52a and 52b. The deflection angle of the micromirror 21 is limited by the configuration of the elastic hinge 53 that come into contact with the upper portions of the address electrodes 52a and 52b.

Figure 6C:
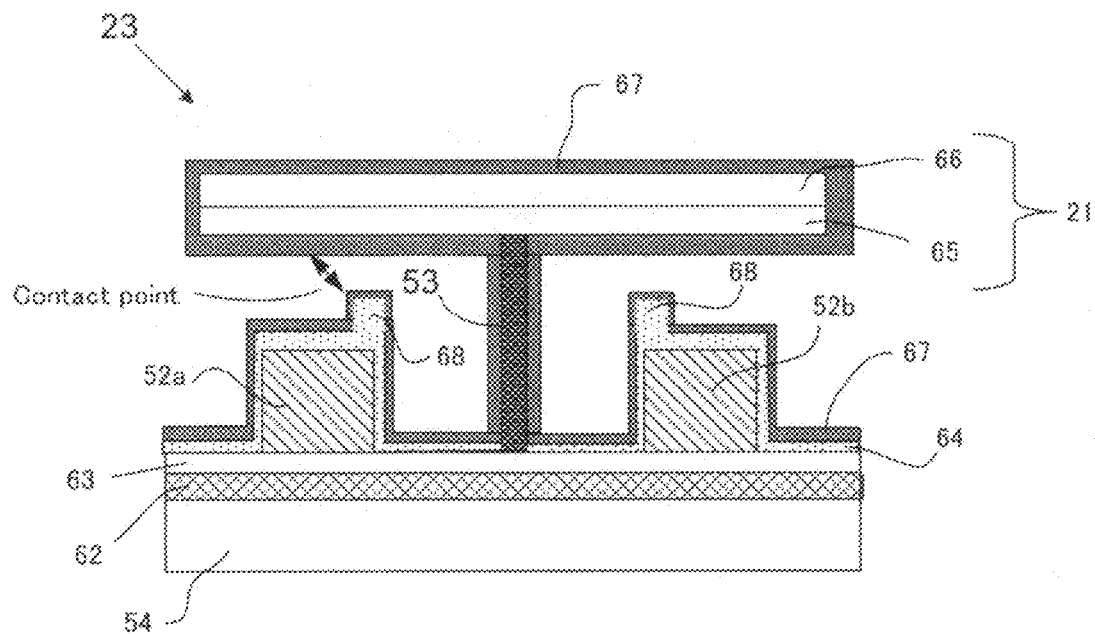
FIG. 6C is a side cross sectional view that shows one mirror element in which an elastic hinge including an oriented monolayer contacts a stopper formed on an address electrode.

FIG. 6C shows an example of a mirror element in which a projection portion 68 of the address electrodes 52a and 52b is provided as a stopper. With the configuration when the address electrodes 52a and 52b are also implemented as the stoppers, the distance between the address electrodes 52a and 52b and the micromirror 21 can be shortened. The shortened distance allows a control mechanism for controlling the micromirror with significantly increased Coulomb force. The shortened distance thus allows the application of a lower voltage to the address electrodes 52a and 52b.

Figure 6D:
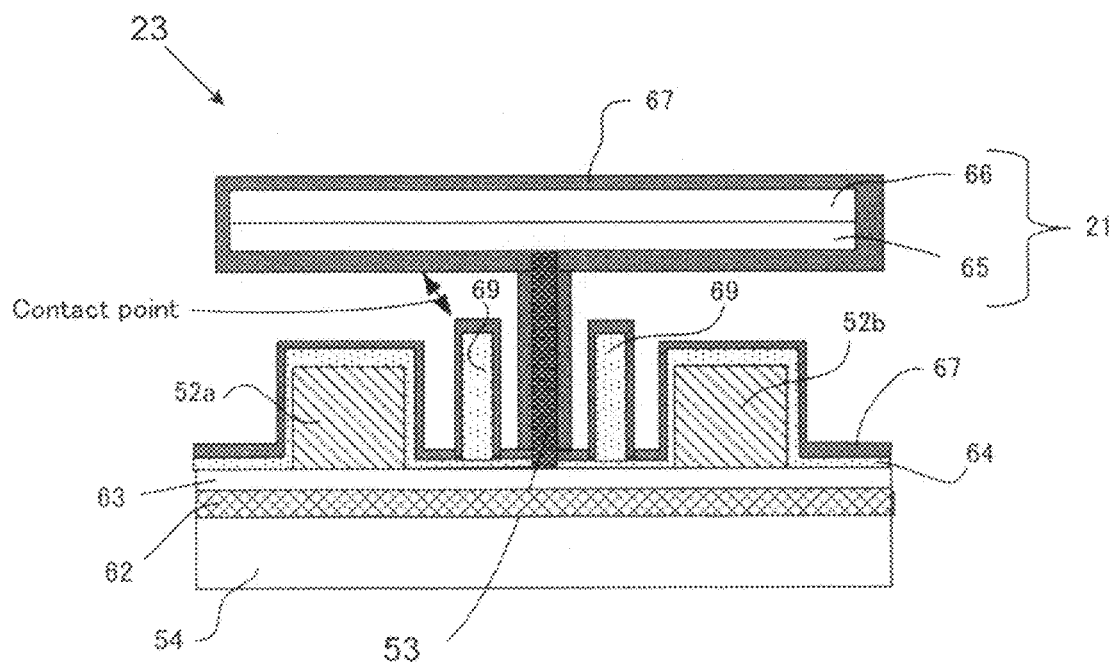
FIG. 6D is a side cross sectional view that shows one mirror element in which an elastic hinge including an oriented monolayer contacts a stopper.

FIG. 6D shows another exemplary embodiment of a mirror element in which a stopper portion 69 is provided between the address electrodes 52a and 52b and the elastic hinge 53. As shown in FIG. 6D, it is desired that the stopper portion 69 is arranged near the deflection axis of the micromirror 21, and the address electrodes 52a and 52b are arranged at a greater distance away from the deflection axis. With a greater distance between the mirror and electrodes, the Coulomb force between the micromirror 21 and the address electrodes 52a and 52b is reduced. The arrangement of the position of the electrodes determines the rotation moment according to the arrangement of the address electrode relative to the location of the deflection axis. In contrast, by arranging the stopper portion 69 closer to the deflection axis, the force against the stiction force may be increased thus suppressing the problems of stiction of the micromirror to the stoppers. If the stopper is configured to also function as an electrode, the Coulomb force between a stopper and the micromirror also works in addition to the address electrodes 52a and 52b, thereby easily deflecting the micromirror 21

Although not shown in the attached drawings, a stopper structure having a projecting part on the lower surface of the micromirror 21 can be provided to adjust the micromirror 21 to have a different deflection angle. The present invention discloses an antistiction layer 67 composed of an oriented monolayer covering each portion that includes a silicon material exposed to an external field in a mirror element of a micromirror device. For example, in FIGS. 6A through 6D, the anti-stiction layer 67 covers the surface of the bottom layer 65 of the micromirror disposed on the reverse side of the reflecting surface of the micromirror 21, the side surface of the elastic hinge 53, the surface of the address electrodes 52a and 52b and the protective layer 64, etc. on the substrate.

An oriented monolayer can also be formed on the side of the substrate 54 holding a two-dimensional mirror array of the micromirror device by spreading the oriented monolayer with each micromirror device diced from a wafer. Thus, anti-stiction protection can be provided against the submerge of the side of the substrate 54. Thus, by providing the antistiction layer 67 of an oriented monolayer, in FIGS. 6A through 6D, the inter-molecule force and the surface energy causing the stiction can be reduced. The inter-molecular force and the surface energy can be generated at the contact areas between the micromirror 21 and the address electrodes 52a and 52b, the contact part between the micromirror 21 and the elastic hinge 53. The stiction can also occur at the contact areas between the micromirror 21 and the stopper. By applying an anti-stiction layer, the force and energy that may cause the stiction are reduced, and the coefficient of friction can be decreased also, thereby preventing stiction.

Figure 7:
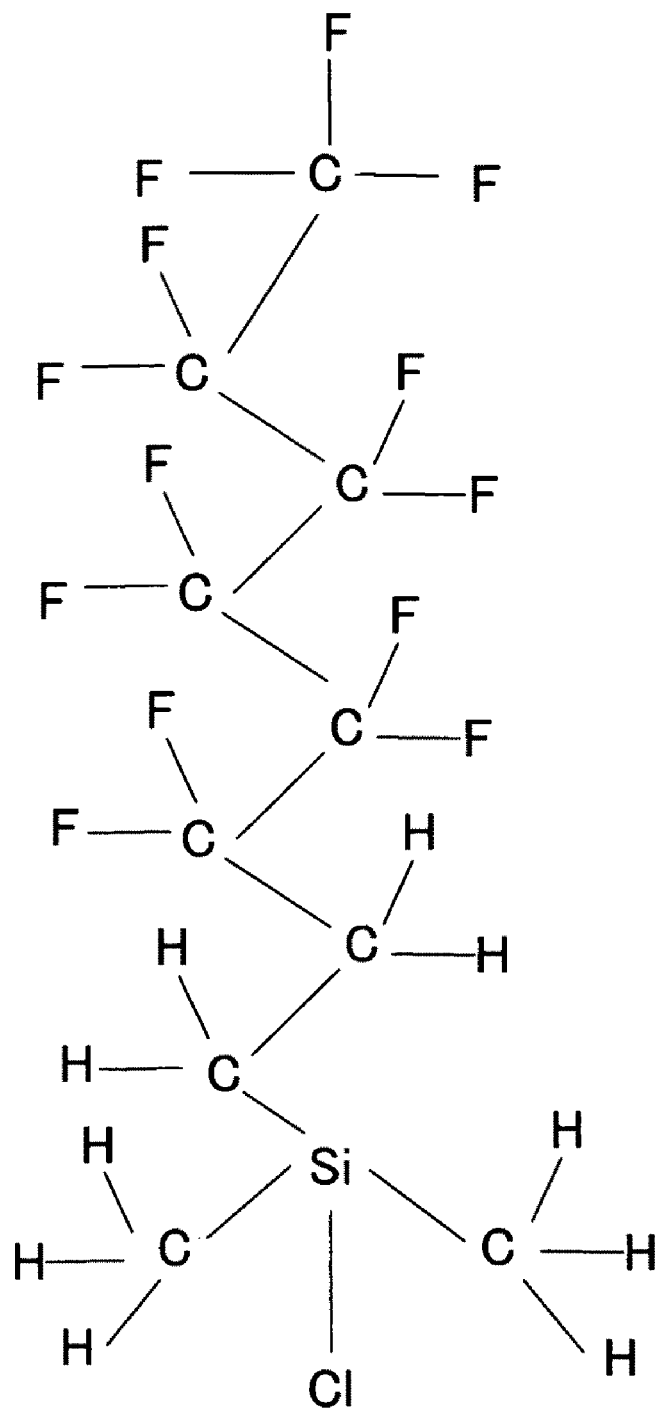
FIG. 7A shows a chemical formula of the VTS (vinyltrichlorosilane; $C_2H_3Cl_3Si$) as a material of an antistiction layer.
FIG. 7B shows a chemical formula of the DDS (dichlorodimethylsilane; $(CH_3)_2SiCl_2$) as a material of an antistiction layer.
FIG. 7C shows a chemical formula of the PFODCS (perfluorooctyldimethylchlorosilane; $CF_3(CF_2)_5(CH_2)_2Si(CH_3)_2Cl$) as a material of an antistiction layer.

FIGS. 7A through 7C show examples of the chemical formulae of some molecules of the oriented monolayer as a material of the antistiction layer 67. FIG. 7A shows the chemical formula of the VTS (vinyltrichloro silane; $CH_2=CHSiCl_3$) as a material of the antistiction layer 67. FIG. 7B shows the chemical formula of the DDS (dichlorodimethylsilane; $(CH_3)_2SiCl_2$) of the halogenated alkyl silane as a material of the antistiction layer 67. FIG. 7C shows the chemical formula of the PFODCS (perfluorodecyldimethylchlorosilane; $CF_3(CF_2)_5(CH_2)_2Si(CH_3)_2(Cl)$) of the halogenated alkyl silane as a material of the antistiction layer 67. Furthermore, a molecule of the oriented monolayer not shown in the attached drawings can be OTS (octadecyltrichlorosilan; $CH_3(CH_2)_{17}SiCl_3$), PFOTS (perfluorooctyltrichlorosilane; $CF_3(CF_2)_5(CH_2)_2SiCl_3$), UTS (undecenyltrichlorosilane; $CH_3(CH_2)_{10}SiCl_3$), DTS (decyltrichlorosilane; $CH_3(CH_2)_{11}SiCl_3$), and various other materials.

Thus, a molecule forming an oriented monolayer as a material of the antistiction layer 67 can mainly be halogenated alkyl silane and alkyl silane. When the molecule of the oriented monolayer as a material of the antistiction layer 67 has a carbon straight chain portion, all or a part of hydrogen-H coupled to the carbon of the carbon straight chain portion can be replaced with halogen. Furthermore, a molecule of the oriented monolayer having the carbon straight chain portion as a material of the antistiction layer 67 can be a carbon compound in which a carbon-carbon bond is saturated or unsaturated. In addition, a molecule of the oriented monolayer having a carbon straight chain portion in which a carbon-carbon bond is saturated or unsaturated as a material of the antistiction layer 67 can have all or a part of hydrogen-H coupled to carbon replaced with halogen.

It is also preferable that a molecule of the oriented monolayer that has —$CH_3$ base, =$CF_2$, or —$CF_3$ base at one end portion, and halogenated silane or halogenated alkyl silane base at the other end portion is applied as a material of the antistiction layer 67.

The above-mentioned oriented mono-molecule reacts and is coupled with silane in the member that includes Si to function as the protective layer 64 or the layer 65 that includes a silicon material as shown in FIG. 6A. The coupling is caused by the condensation reaction between the oriented monomolecule having a halogen element at one molecule end and the hydroxyl-OH on the substrate surface.

As a result, an unsaturated carbon bond or a long carbon chain is included in the oriented monolayer coupled to the substrate surface, thereby inducing the hydrophobic property on the substrate surface. Furthermore, the condensation reaction forms a non-conductive —Si—O—Si— coupling on the substrate surface, thereby increasing the resistance value and improving the electrical insulation. Furthermore, inter-molecule force can be reduced by placing =$CF_2$ or —$CF_3$ outermost on the substrate surface.

Figure 8A:
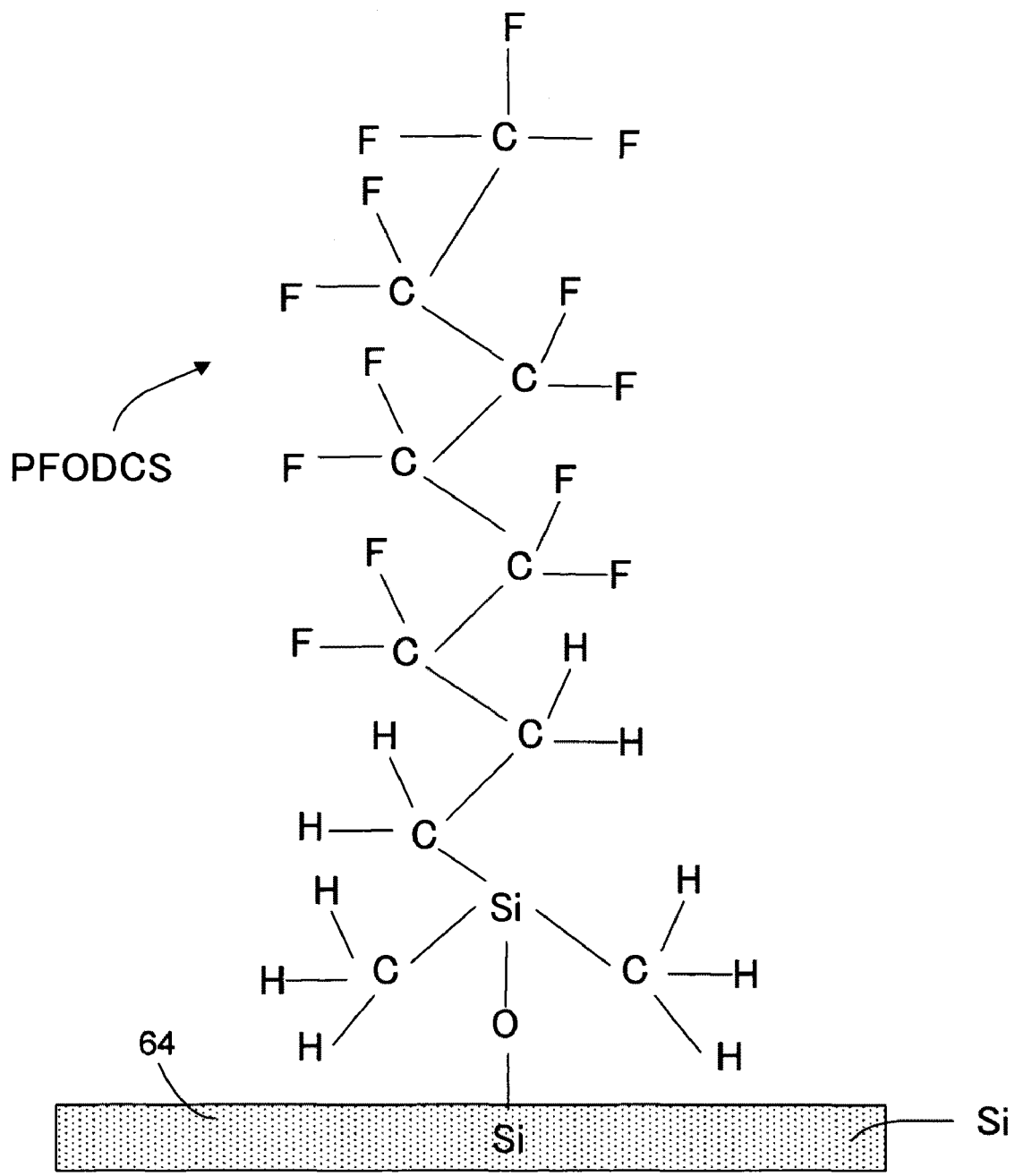
FIG. 8A is a schematic diagram for showing the state of depositing the PFODCS (perfluorooctyldimethylchlorosilane; $CF_3(CF_2)_5(CH_2)_2Si(CH_3)_2Cl$) as a hydrophobic monomolecule on the surface of the substrate shown in FIG. 6A or 6B.

FIG. 8A shows the state of forming and spreading the PFODCS (perfluorodecyldimethylchlorosilane; $CF_3(CF_2)_5(CH_2)_2Si(CH_3)_2Cl$) as a hydrophobic monomolecule layer on the protective film of the micromirror device shown in FIGS. 6A through 6D. FIG. 8A is a diagram for illustrating the Cl of the halogen element at the end portion of the PFODCS reacts with hydroxyl-OH on the surface of the protective layer 64 composed of the silicon material on the substrate surface, and the PFODCS forms —Si—O—Si— coupling with the protective layer 64.

In the process, Cl of the halogen element at the end portion of the PFODCS reacts with the hydroxyl-OH on the protective layer surface, and is removed as HCl. Thus, the PFODCS is —Si—O—Si-coupled on the protective layer 64 of the substrate surface to form an oriented monolayer.

In addition, since the bottom layer of the micromirror and the elastic hinge are formed by a member including a silicon material having Si, all the surface areas can be provided with a stable oriented monolayer by performing a similar process.

Figure 8B:
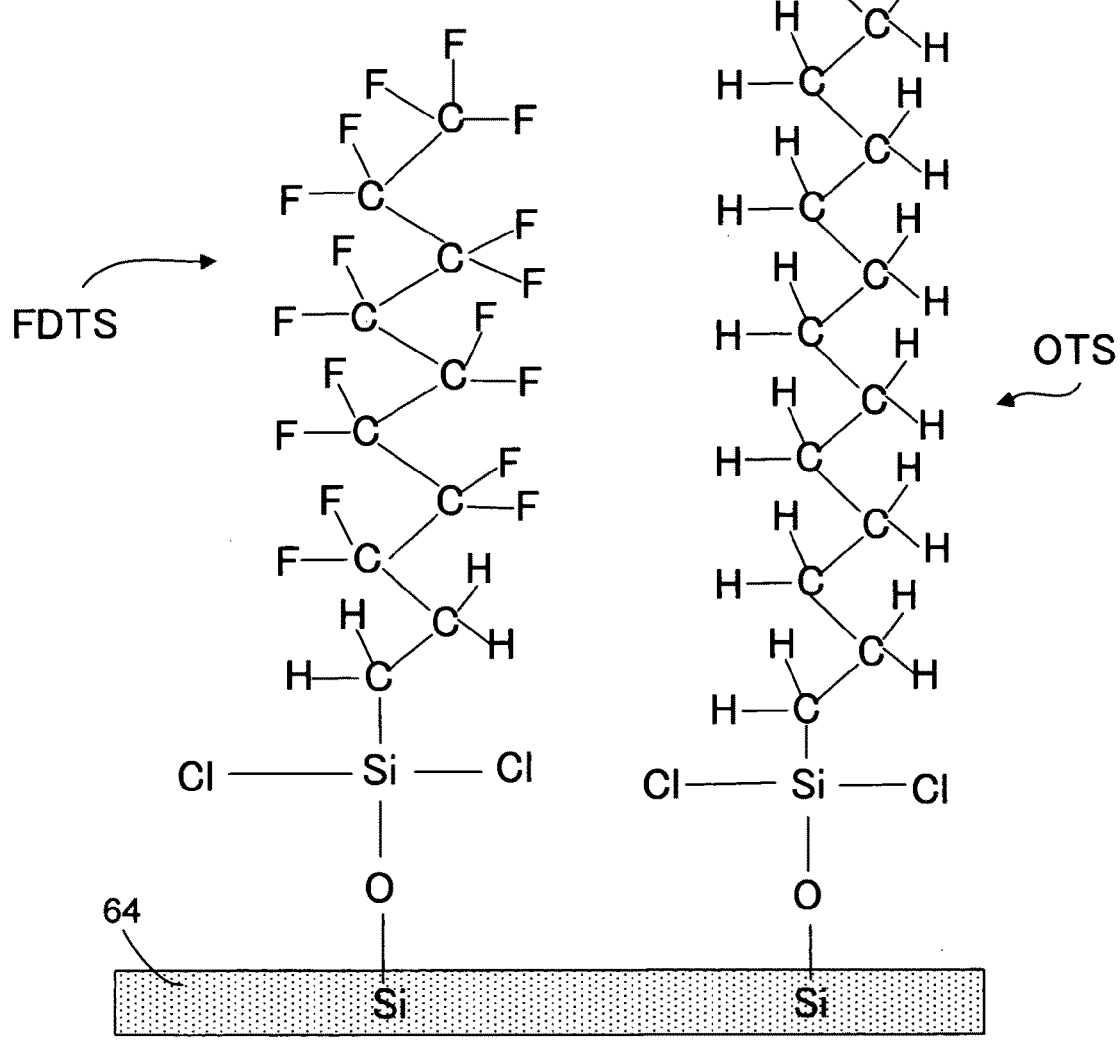
FIG. 8B is a schematic diagram for showing the state of depositing an oriented monolayer using two different hydrophobic monomolecules on the substrate surface as a variation example of FIG. 8A.

FIG. 8B is a diagram to show the process of forming an oriented monolayer using two or more different hydrophobic molecules on a protective layer as a variation example of FIG. 8A. FIG. 8B shows as an example of applying two different molecules, such as the OTS having on one end portion of one of the monomolecules a methyl-$CH_3$, and the FDTS having —$CF_3$ of a high electric negative level, on the surface of the protective layer 64 of the same substrate. In addition, the process may also use a DTS having on one end portion of a monomolecule a methyl-$CH_3$, the PFOTS having —$CF_3$ of a high electric negative level, etc. As in the case shown in FIG. 8A, the OTS and the FDTS form —Si—O—Si— coupling on the surface of the protective layer 64. Therefore, an oriented monolayer including two different compounds is formed on the surface of the protective layer 64.

An oriented monolayer can also be formed on the surface of the protective layer by using a mixture of two or more types of molecules having different carbon numbers or halogen numbers of the oriented monomolecules. In these processes, various hydrophobic states can be formed on the substrate surface depending on the specific processing and surface conditions of a micromirror device. Thus, the antistiction layer can effectively prevent the stiction caused by the surface energy due to the water content attached to the substrate at the contact part of two members of a micromirror device.

Figure 8C:
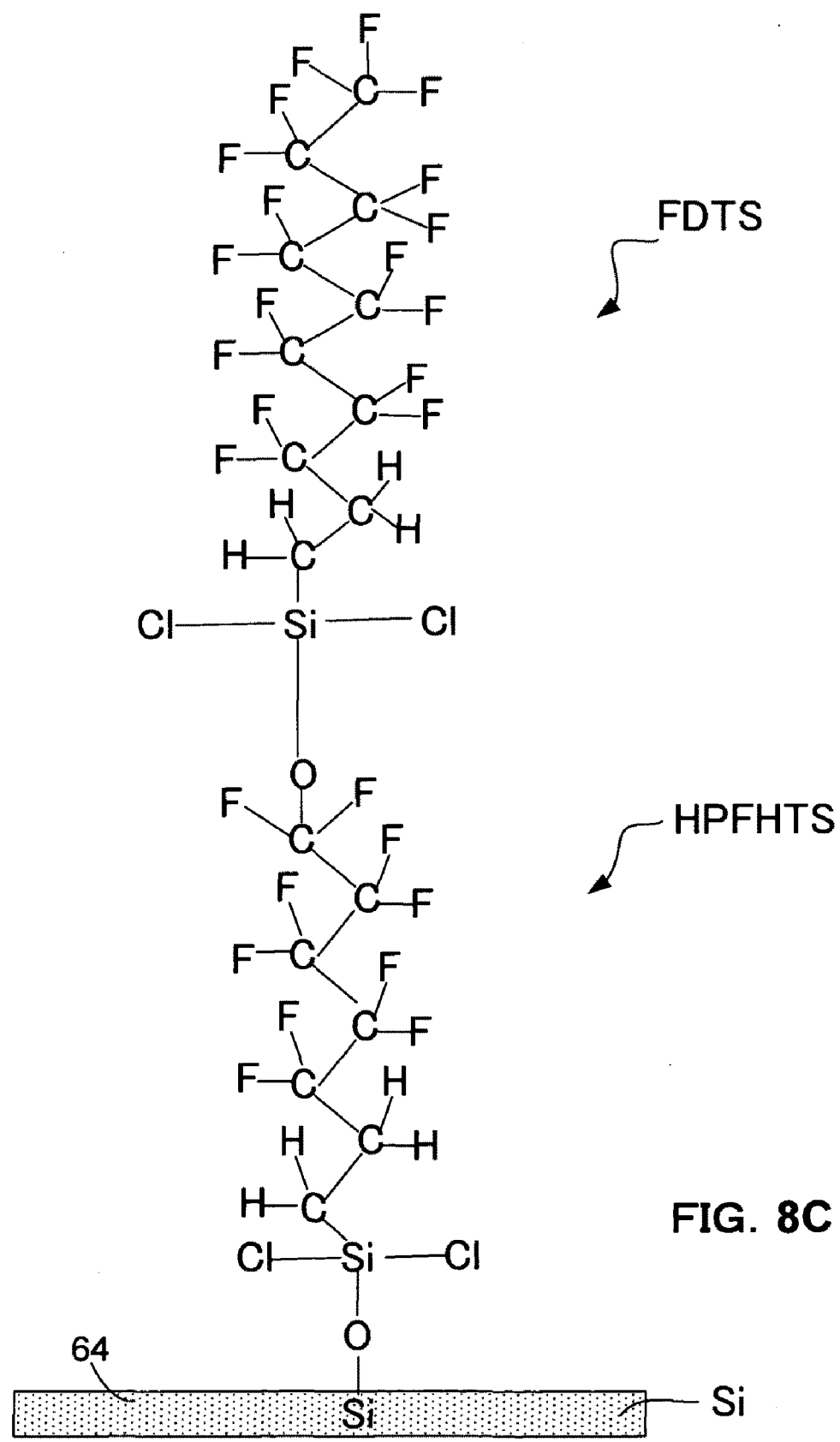
FIG. 8C is a schematic diagram for showing the state of depositing an oriented monolayer using a hydrophobic monomolecule obtained by coupling two different oriented monomolecules on the substrate surface as a variation example of FIG. 8A.

FIG. 8C shows the processing conditions of forming an oriented monolayer with two or more different molecules are combined and coupled on the protective layer of a substrate. For example, in FIG. 8C, the monolayer is processed by using a trichlorosilane-$SiCl_3$ of halogenated silane at the end portion of one molecule coupled to the protective layer as a molecule of the first layer coupled to the protective layer, and the HPFHTS (hydroxy-perfulorohepthyltrichlorosilane; $CF_2OH(CF_2)_4(CH_2)_2SiCl_3$) having a hydroxyl-OH at the other end portion.

The HPFHTCS is applied to form the first layer to couple to a second layer. The FOTS having at one end portion a trichlorodilane-$SiCl_3$ of the halogenated silane coupled to the hydroxyl-OH of the first layer, and having at the other end —$CF_3$ is coupled and applied as the second layer. The hydroxyl-OH can be replaced with carboxyl-COOH As shown in the example, an oriented monolayer of a thick film identical to the molecule having the number of fluorinated carbon of 8 through 12 can be formed by using an oriented monolayer. The monolayer is implemented with a molecule having a high film forming speed that has a low molecular weight of 6 or less of the number of fluorinated carbon coupled to two layers. In the molecule coupled in the two layers, potential environmental impacts can also be suppressed by decreasing the number of fluorinated carbon. Plural molecules can also be coupled as plural layers without limiting to two layers.

The descriptions below provide details of controlling a mirror element formed with antistiction layer that includes an oriented monolayer.

Figure 9A:
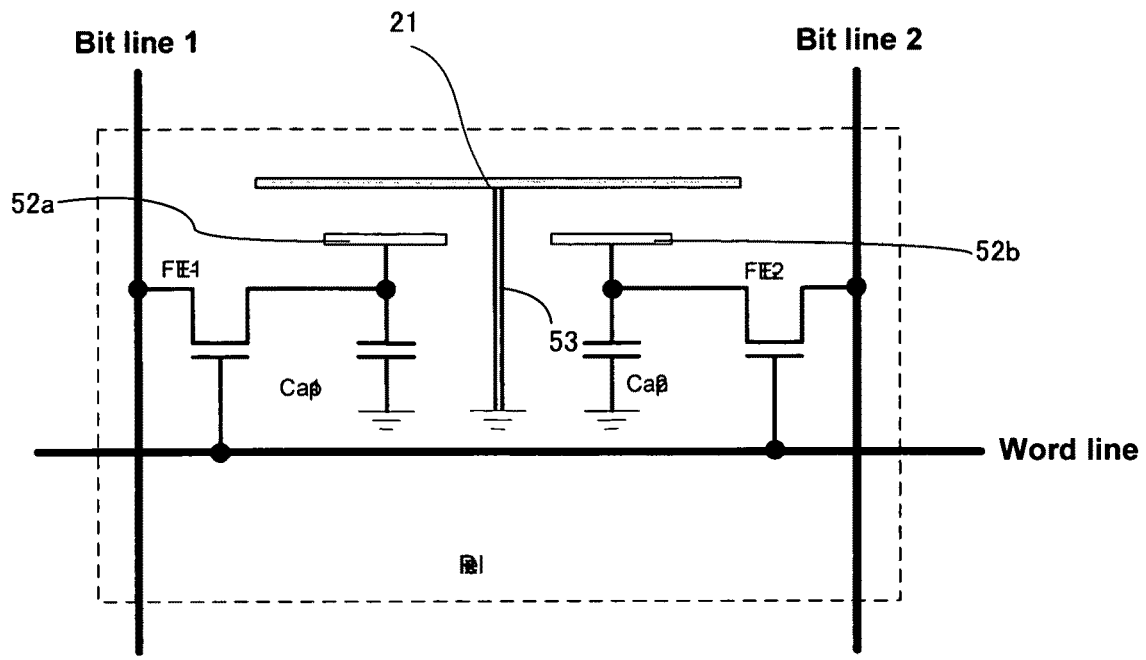
FIG. 9A shows the configuration of the drive circuit of one mirror element of a micromirror device in which an antistiction layer of an oriented monolayer.

FIG. 9A is a cross sectional view that shows the configuration of a drive circuit of one mirror element in a micromirror device provided with an oriented monolayer. FIG. 9A shows a circuit that includes a FET (field effect transistor)-1 connected between the electrode 52*a*, a bit line 1, and a word line. The circuit further includes a capacitance Cap-1 connected between the electrode 52*a* and the GND. Similarly, a FET-2 is connected between the electrode 52*b*, a bit line 2, and a word line, and a capacitance Cap-2 is connected between the electrode 52*b* and the GND.

A drive circuit applies signals to the bit lines 1 and 2 and the word line and also applying a predetermined voltage to the electrode 52*a* to control the mirror 21 to deflect toward the electrode 52*a*.

Similarly, by controlling the signals of the bit lines 1 and 2 and the word line, a predetermined voltage may also be applied to the electrode 52*b* to tilt the mirror 21 toward the electrode 52*b*. The drive circuit is formed and supported on the substrate of the micromirror device.

Figure 9B:
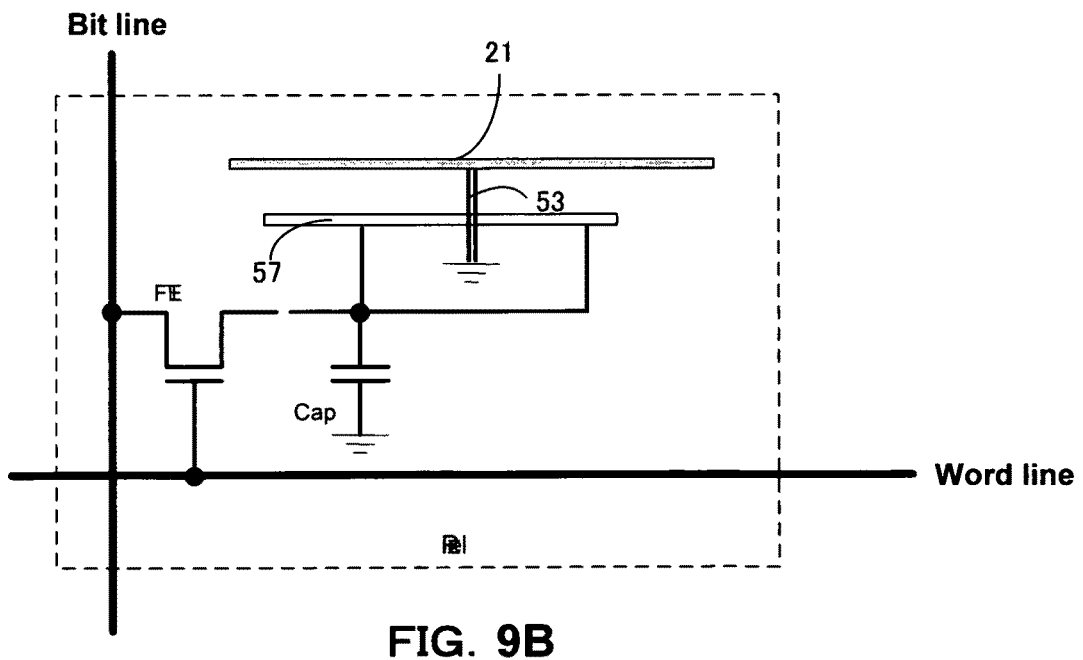
FIG. 9B shows an alternate configuration of the drive circuit of a mirror element shown in FIG. 9A.

FIG. 9B shows an alternate embodiment of the drive circuit of the mirror element shown in FIG. 9A. In the this exemplary embodiment, one address electrode is implemented for controlling the micromirror 21 for one mirror element, and one address electrode 52 is arranged over the ON light side and the OFF light side to which the micromirror 21 is held in a deflected state. In addition, one bit line and word line is provided for a mirror element to transfer signal data to the address electrode 52 for controlling of the deflection of one mirror element.

The micromirror 21 is controlled to deflect by one address electrode 52 and one drive circuit. The deflection angle is designed and defined by the area, the height, etc. of the address electrode 52 configured with asymmetric configuration relative to the elastic hinge and the deflection axis of a mirror. A method for controlling the mirror to operate from an initial state to move to the OFF state, and then deflect to the ON state. The control processes are dependent on the facts that the areas of the left and right address electrodes 52 are made different in the elastic hinge 53, and the electrode having a larger area is placed in the OFF state. The mirror is tilted to the address electrode that has a larger area by applying a voltage to the address electrode from the initial state in which no voltage is applied.

It can be understood that there is a strong effect of the Coulomb force because of a larger amount of electric charge are held in a larger area than the ON state side where the address electrode has a smaller area that the address electrode on the OFF state side. The effect of the amount of Coulomb force can be expressed by the Equation (4) below. An alternate embodiment may also be configured by setting an equal distance between the micromirror 21 and the address electrode 52 in the electrode portion on the OFF side of the ON side electrode portion of the address electrode in the initial state.

$$F = \frac{1}{4\pi r^2} \cdot \frac{1}{\varepsilon} q_1 q_2 \qquad (4)$$

Where r represents the distance between the address electrode and the mirror, $\in$ represents a dielectric constant, and $q_1$ and $q_2$ represents the amounts of electrical charges. The control processes followed by controlling the micromirror 21 to tilt from the initial state to the OFF light state and then enters a free oscillation state by temporarily setting the voltage of the address electrode 57 to 0V. In the free oscillation state, the micromirror can be placed at the ON side and held in the ON state by applying a voltage at an appropriate time when the micromirror is close to an electrode that has a smaller area of the address electrode on the ON side.

With the Coulomb force F as defined by equation (4), the square of the distance r has a more dominant factor than the amounts of charges $q_1$ and $q_2$. Therefore, when the areas of both ON side and OFF side of one address electrode are appropriate adjusted, the Coulomb force F works more effectively on the micromirror that has shorter distance between the address electrode and the micromirror even though the area of the electrode portion on the ON side of the address electrode is smaller than the electrode portion on the OFF side, thereby deflecting the micromirror toward the ON light side. As described above, the micromirror controlled by one address electrode and one set of wiring is deflected from the initial state to the OFF light state, and then to the ON light state.

Another method to control the deflection of a micromirror may also be implemented by applying a voltage according to a multiple stage processes to the address electrode. For example, after keeping the mirror to operate at a certain state by holding an ON state or an OFF state with a voltage applied to an address electrode, the voltage of the address electrode is set to 0V, thereby set the micromirror in the free oscillation state. Furthermore, the micromirror can be controlled in the ON light state by applying a voltage weaker than the voltage used in the initial state at an appropriately controlled time when the distance between the address electrode on the ON light side and the micromirror is still short while the freely oscillating micromirror is traveling from the ON side to the OFF side. Therefore, when the micromirror is freely oscillating, and when the distance between the micromirror and the address electrode is short, the micromirror can be controlled with a lower voltage that is lower than the voltage applied when the micromirror is deflected from the initial static state to the ON state or the OFF state.

Figure 10A:
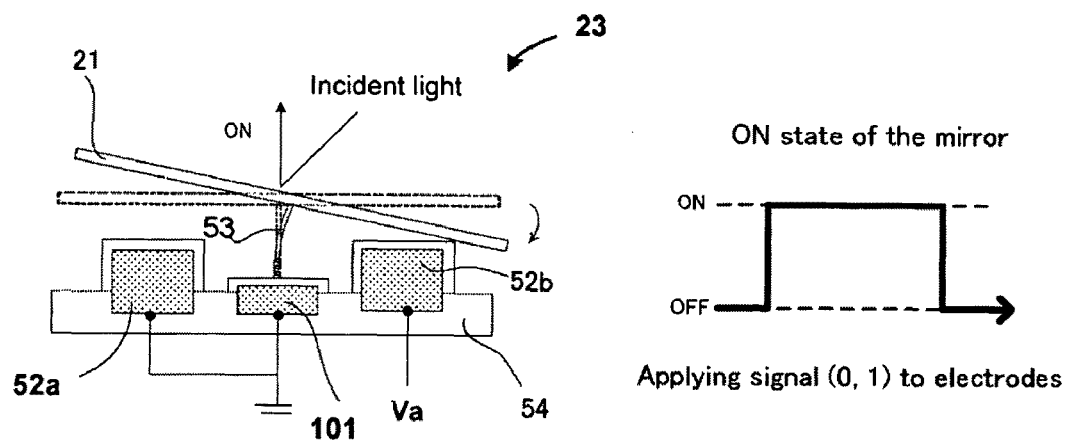
FIG. 10A includes a side cross section view of a micromirror and a timing diagram to illustrate the operation at an ON state which reflects incoming light fully for projection path.
Figure 10B:
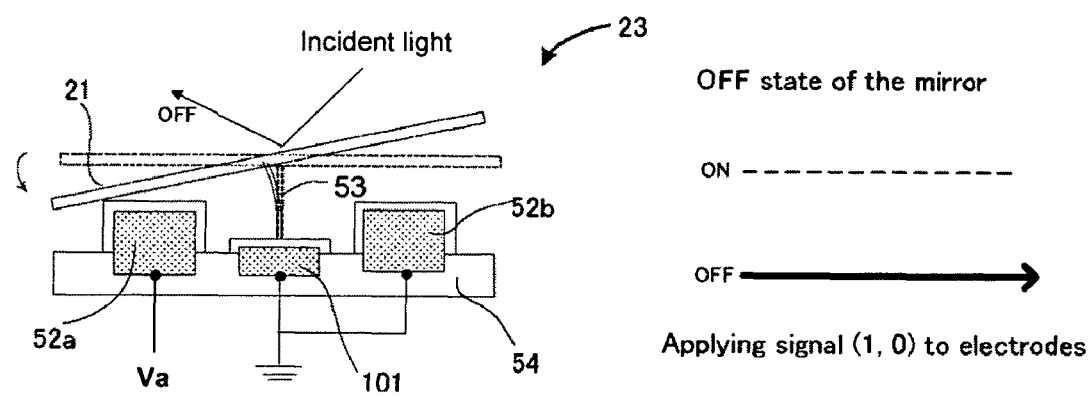
FIG. 10B includes a side cross section view of a micromirror and a timing diagram to illustrate the operation at an OFF state which does not reflect incoming light for projection path.
Figure 10C:
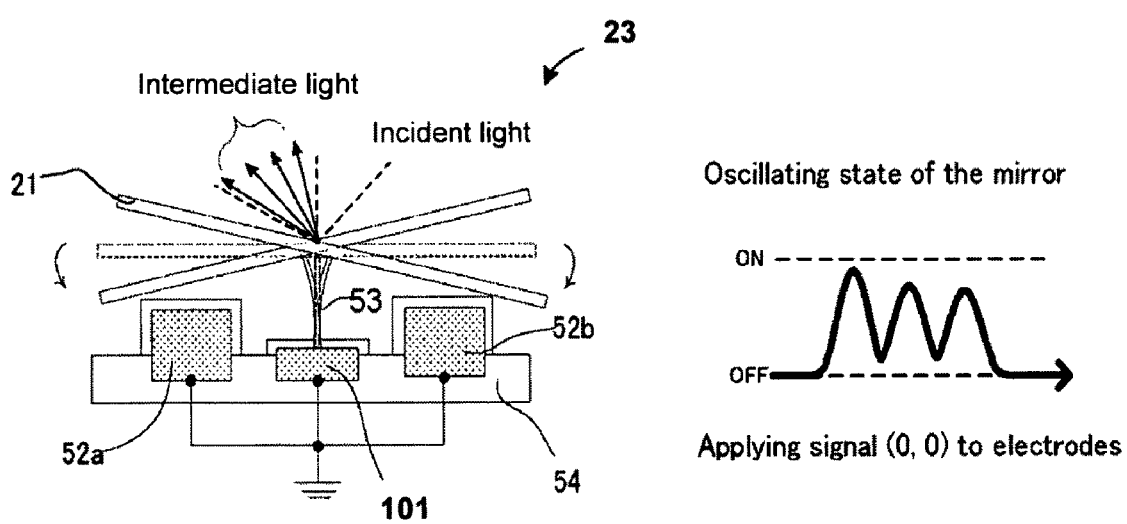
FIG. 10C and a timing diagram to illustrate the operation a micromirror and a timing diagram to illustrate the operation at an oscillating state which reflects incoming light for projection path partially.

Accordingly, the deflection of a micromirror can be controlled by setting plural digital steps of voltage values for a mirror element implemented with one address electrode and one set of wiring. By applying a reduced voltage to control the micromirror also reduces the holding force of the micromirror to an electrode. The reduced holding force is advantageous in preventing the problem of stiction. FIGS. 10A, 10B, and 10C are diagrams to show the control processes for deflecting a micromirror in the ON light state, the OFF light state, and the oscillation state. The mirror is deflected by applying a voltage to the address electrode in a mirror element implemented with an antistiction layer of an oriented monolayer.

FIGS. 10A and 10B illustrate the changes of the reflection light when the micromirror is deflected to different angles. The ON position of a mirror 21 is usually designated as the mirror position when the mirror reflects the maximum brightness and the OFF position is designated for a mirror position when the mirror reflects the minimum brightness within the drivable range of angles. By operating the mirrors 21 in the condition for the mirror to reflect light partially, the micromirror may be controlled to project incremental amounts of lights that is smaller that the amount of lights represent by the LSB brightness. The control mechanism thus allows to increase the total number of controllable grayscales.

In the conventional systems, a mirror 21 is driven to an ON position with (0,1) signal applied to the electrodes 52b beneath the mirror 21, wherein (0,1) is defined as zero volt is applied to the left electrode 52b and an ON voltage is applied to the right electrode 52a as illustrated in FIG. 10A. In contrast, a mirror control signal represented by (1, 0) is applied to drive the mirror 21 to an OFF position.

As illustrated in FIG. 10C, when a mirror 21 is controlled to operate in an oscillating condition, the light reflected from the oscillating mirror as the output light is below that of ON position. The oscillations of the mirror is controlled by providing two electrodes 52a,52b under the mirror 21 with zero volts or (0, 0), when the mirror 21 is in the position of ON or OFF state. A micromirror system implemented with configuration shown in FIG. 1C according to the conventional technologies cannot achieve such operations unless the system is changed to receive multiple bit input control.

Various computerized simulations revealed that the average reflectance is from 20% to 40% depending on optical configurations. By choosing an optical system suitably, the micromirror may be control to adjust the reflectance to 25% or ¼. This enables us to obtain ¼ of output brightness without changing the intensity of incoming light. By applying multiple pulses to the electrodes 52a,52b under the mirror 21 as illustrated in FIG. 10C (the arrows in left side) in the middle of an ON position, the amount of the reflecting light from the micromirror may be controlled to achieve ¾ of reflectance. The voltages applied to the address electrodes 52a and 52b for holding the micromirror 21 may be reduced when the deflection angle of the micromirror 21 for the ON light state or the OFF light state is reduced. Conversely, when the deflection angle of the micromirror 21 for the ON light state or the OFF light state is increased in order to recover the Coulomb force and the elastic hinge 53 for holding the micromirror 21, the difference of the forces applied to the micromirror 21 for recovery can be freely set, and an advantageous state can be appropriately set for reducing the probability of stiction. As described above, it is preferable to set lower force of the micromirror 21 in contacting the address electrodes 52a and 52b when also functioning as a stopper to prevent the problem of stiction. The contacting force can be reduced by reducing the potential difference between the address electrodes 52a and 52b and the micromirror 21 thus reducing the Coulomb force.

The following descriptions disclose the projection device that includes a micromirror device implemented with the above-mentioned oriented monolayer. A projection device is configured such that the voltages applied to hold the micromirror at the deflection angles of the ON and OFF projection are non-symmetrical. An oriented monolayer is formed to cover the address electrode, the stopper, and areas below the micromirror. The reflection light along an ON direction is projected to a projection lens for projection of light for image display reflected by the micromirror device.

Stiction of mirror may be prevented by increasing the frequency of deflecting the micromirror of the projection device toward OFF state or by increasing the time required for the micromirror to reach the OFF state by reducing the potential difference between the address electrode and the micromirror on the OFF light side.

Conversely, the stiction can also be prevented by reducing the potential difference between the address electrode and the micromirror on the ON light side. However, a black pixel fault may occur. For this reason, an improved display quality may be implemented by reducing the potential difference in the OFF address electrodes instead of the ON address electrodes. Therefore, it is preferable to design the micromirror device with the electrode on the OFF light side despite the potential problems of stiction.

Furthermore, the micromirror can be controlled to operate in the free oscillation state, and the frequency of optical modulation control can be set at a higher value to prevent the micromirror to have a prolonged contact the stopper for preventing the occurrences of mirror stiction. With such control schemes, the projection gray scale levels can be increased by precisely setting the quantity of light to be reflected and projected by the micromirror.

In the free oscillation state in which a micromirror oscillates plural times after temporarily contacting the stopper, it is further desirable to shorten the time of holding the micromirror onto the stopper. The durability requirement of an oriented monolayer on the surface of the stopper for the purpose of protecting against the stiction may also be reduced by implementing freely oscillating micromirror. More flexibility is allow to select the antistiction material from a wide selection of materials. According to the above descriptions, the stiction may be prevented by providing different control voltages during the free oscillation operations in the ON light state and the OFF light state, and also by controlling the micromirror at a low voltage without stiction.

When the micromirror is in the horizontal state, the distance between the micromirror and the address electrode is the longest, and the recovery force of the elastic hinge is at a lowest value. On the other hand, when the micromirror contacts the address electrode or a stopper, the distance from the micromirror and the address electrode is the shortest, and the recovery force of the elastic hinge is at a highest value. The elastic hinge in this case has high recovery force in proportion to the amount of deformation of the elastic hinge. The Coulomb force is generally inversely proportional to the square of the distance between the address electrode and the micromirror. Therefore, the Coulomb force required to hold the micromirror for contacting the address electrode or a stopper is typically lower than the Coulomb force required to drive the micromirror from the horizontal state.

Therefore, at the time when the micromirror contacts the address electrode or a stopper, the voltage applied to the address electrode is reduced. Thus, force holding the micromirror to the address electrode or the stopper is reduced and the stiction can be further reduced.

In addition, at the time when the micromirror contacts either the address electrode or the stopper, the stiction can be further prevented by generating a Coulomb force in the direction of deviating from the contact state of the mirror by applying a voltage to an address electrode arranged in the opposite direction.

Furthermore, the maximum deflection angle of the micromirror is typically in the range of 10° through 12° and is determined by the position and size of the projection lens. Normally, when a brightness projection lens (for example, F number 1.8 etc.) is used, the diameter of the lens is large. Inversely, if a dark projection lens is used, a projected image becomes dark. Taking the above-mentioned facts into account, it is preferable to use a projection lens having an F-number of about 2.4. When the projection lens having the F number of about 2.4, the aperture NA is about 0.2, and it is preferable to configure a projection system with the maximum deflection angle of about 12°.

The length of one side of a micromirror operated with only ON light or OFF light state is substantially between 10 µm through 14 µm. Accordingly, the length along the direction of the mirror deflection, i.e., along a diagonal direction of mirror, is between 14 µm to 20 µm.

Therefore, when the deflection angle is 12°, a maximum displacement of about 2 µm (=sin 12°×20 µm/2) at the tip of the micromirror is generated. Furthermore, when laser light is used as a light source, the degradation of the spatial frequency at high resolution is lower than with a normal mercury lamp etc., thereby providing a sufficient resolution with a smaller diameter of the projection lens. In addition, since a laser is low in the spread of luminous flux and high in straightness, the brightness is not reduced even with a smaller micromirror device based. The advantage is achievable because of the relationship between the aperture NA and the etendue relating to the illumination area. Then, the size of the micromirror of the mirror element of a micromirror device further operated with the oscillation state or the intermediate state can be designed for 14 µm through 4 µm.

With this configuration, when the maximum deflection angle of the mirror in the oscillation state or the intermediate state is 6°, the tip of the micromirror is displaced by about 1 µm (=sin 6°×20µ/2), and the amount of displacement of the tip of the micromirror is about half the distance compared with the micromirror operated with only the ON light or OFF light states. When the deflection angle is 6°, NA=Sin 6°=0.1, the F number of the projection lens is about 5, and an a small projection lens can therefore be implemented.

By shortening the distance between the micromirror and the address electrode, the Coulomb force working between the micromirror and the address electrode is increased significantly because of the relationship of inversely proportional to the square of the distance. It is further advantageous that the address electrode is positioned in the deflection direction toward a smaller deflection angle of the micromirror. Such configuration is designed in advance to set a short distance between the micromirror and the address electrode. The area of the address electrode can also be increased to more effectively control the micromirrors. With the configuration, the voltage to be applied to the address electrode can be controlled at a low voltage.

In an exemplary embodiment, when the micromirror size is 8 µm and the deflection angle is 6°, the displacement at the tip of the micromirror is about 0.6 µm. Therefore, the minimum distance between the micromirror and the stopper or the address electrodes can be 0.6 µm. As described above, in the micromirror device operable with an oscillation state or intermediate state may achieve a micromirror with reduced size. Furthermore, the control voltage for deflecting the micromirror into a stopper can also be reduced. Furthermore, the gap between micromirrors can also be reduced with smaller deflection angle. Because when the micromirror tilts, the distance of the displacement in the direction of the adjacent micromirror, along a horizontal direction, is also shortened.

When the micromirror has size of 8 µm and the gap is 0.35 µm, the aperture rate is about 90% or more. With a high aperture rate, the quantity of reflected light is increased, and a smoother image can be provided without reducing the gap between the pixels of the projected images. Thus, it is important to select appropriate materials for laying a molecule as antistiction protection layer in producing a display device of a small gap between mirrors and a short distance between the mirror and the stopper.

In addition, when the micromirror size is reduced to 4 µm from the original size of 7 µm, the total size of the micromirror device can also be miniaturized. When the micromirror size is 5 µm square, and the number of pixels is equivalent to XGA, the micromirror device can be reduced to about 0.25 inch in diagonal. With the number of pixels corresponds to the HDTV, the micromirror device may be provided at a size of about 0.44 inch in diagonal. Thus, the micromirror device can be further miniaturized. Therefore, using the small micromirror device, a more compact projection device can also be manufactured.

With the projection device using a plurality of smaller micromirror devices, R (red), G (green), and B (blue) can be simultaneously displayed. The problems of color break-up phenomenon can be prevented. Furthermore, with a projection lens to project the light reflected by the micromirror device, the projection device implemented with a plurality of micromirror devices can present brighter images.

In the above-mentioned micromirror that has smaller size, the distance between a micromirror and an address electrode can be reduced, and the control voltage for the micromirror or the voltage applied to the address electrode to hold the micromirror can be also be reduced. The reduced voltage for holding the micromirror will further reduce the probability of potential stiction problems.

Furthermore, the deflection angle of the micromirror can be different between the ON light state and the OFF light state. It is preferable to make the deflection angle for the OFF light state smaller. Alternately, it is preferable to make the distance between the address electrode and the micromirror can be shorter for the OFF light side. The shorter distance or smaller deflection angle reduce the necessary voltage applied to the address electrode for deflecting the micromirror. Thus, the force for holding the micromirror to the address electrode and the stopper can be reduced, and therefore preventing the occurrences of the mirror stiction.

According to current state of the art, the voltage for temporarily deflection-controlling the micromirror from the horizontal state to the ON light side and the OFF light side is performed by applying a voltage of about 20V. However, in the present embodiment, by operating the micromirror with reduced deflected angle, the micromirror is controlled by applying the voltage of about 5V to the address electrode. In the present embodiment, two-stage control voltages can be applied by first applying a voltage of 15V voltage and the subsequent application of a voltage of about 5V. The number of stages is not limited to two; multiple levels of control voltages may be flexibly applied. Therefore, the voltage for deflecting the micromirror can be reduced, the maximum control voltage of the micromirror can be 5V through 15V, and the initial control from the horizontal state of the mirror and the modulation control of the mirror can be conveniently carried out. An exemplary embodiment, there is a transistor having the resistance to about 12V according to the wiring rule of 0.18 µm, and the drive circuit for controlling the micromirror can be simpler than in the prior art.

As described above, the present invention discloses the drive circuit of the micromirror controllable by a applying a lower voltage without increasing the number of types of the control voltage.

In order to make a smaller micromirror and to project more smooth images, it is necessary to reduce a gap between micromirrors from 0.55 µm to 0.3 µm, 0.15 µm, and even 0.09 µm. The gap reduction is required because the quantity of reflected light of illumination light decreases when the gap between micromirrors grows or a micromirror becomes smaller. Furthermore, the image quality of smoothness suffers with increased gap between micromirrors as discontinuities between image pixels are projected when there are larger gaps between the micromirrors. Therefore, when a micromirror device is used as a display device of images, it is generally a design goal in making the smallest possible gap between micromirrors for presenting a smooth image with improved resolution by increasing the number of micromirrors with smaller gaps.

Furthermore, a smaller gap between micromirrors, the required quantity of illumination light projected to an oriented monolayer from the irradiation of illumination light source can be decreased. The degradation of the oriented monolayer due to light irradiation can be prevented. Especially, since the light is projected with a high energy including an ultraviolet light area can degrade an oriented monolayer. It is therefore preferred to reduce the gaps between the micromirrors thus reducing the intensity of illumination light thus protecting the antistiction layer from the light. In addition, laser light has recently been widely used as an illumination light source. The light source projecting brighter light of the illumination light is desired. For example, the brightness on the projection surface when white is displayed is to be preferably 500 nit or 800 nit or more. In this case, it is desired that a laser light source of about 2 w or 4 W be used for a reflective micromirror device. Such a laser light source includes a single wavelength, and does not include a wavelength of the ultraviolet light area. Therefore, by using a laser light source of 2 W or more, the brightness of the illumination light increases, but does not project a light with a wavelength of the ultraviolet light area. Such illumination light has less impact to cause the degradation of the oriented monolayer formed by an organic material. Thus, by using the laser light source of 2 W through 4 W light output as an illumination light source, the illumination light for the projection device projected form the light source has brighter illumination than the conventional mercury lamp etc. The irradiation of the laser light on the micromirror device covered with a monolayer of an organic material is for antistiction can be operated without degradation of an oriented monolayer, and a bright projected image can be obtained.

This invention further discloses a configuration to reduce the thickness of a micromirror less than the conventional thickness of about 3000 Å. With a reduced thickness, the recovery force or the potential difference of an elastic hinge for deflecting a micromirror can be reduced, thereby reducing the occurrences of stiction.

Furthermore, this invention further disclosed a configuration for reducing the size of one micromirror to about 10 µm. Furthermore, the micromirror can be divided into two sub-mirrors. With the sub-mirror configuration, the deflection from two sub-mirrors can be individually controlled to further increase the gray scale levels. Thus, by dividing one micromirror into a plurality of sub-mirrors, the control voltage to drive one sub-mirror can be further reduced.

As described above, it is desirable to provide a projection device implemented with a micromirror device that is configured as a mirror array of about 900 thousands or more pixels. The micromirror is configured in the form of substantially square mirror of 11 µm or less, the surface of a mirror has an aluminum or silver reflection surface, and the thickness of the reflection surface is 2000 Å or less.

In another exemplary embodiment, the micromirror device is configured as a mirror array of about 2 millions or more pixels in the form of substantially square mirror of 8 µm or less, and the maximum deflection angle of each micromirror is 14° through 4°.

In another exemplary embodiment, the micromirror device is controlled by applying a different voltage to the address electrode to hold micromirror at the ON state that that is applied to the OFF state. In another exemplary embodiment, the micromirror is controlled by a voltage of 15 volts of less for holding the micromirror at the stopper.

In another exemplary embodiment, the surface of the address electrode or the stopper portion of the micromirror device is covered by SiC, Si, or a protective layer that includes Si. The protective layer of the micromirror device is formed by one or more of the materials of 6 or less halogenated carbon such as FOTS, PFODCS, etc. of an oriented monolayer.

In another exemplary embodiment, the micromirror is formed by a plurality of layers. The bottom side of the reflection surface of the micromirror is configured by a layer including Si or a layer including W, Ti, aluminum, etc. is the bottom side is provided with an antistiction layer formed by one or more of the materials of 6 or less halogenated carbon such as FOTS, PFODCS, etc. of an oriented monolayer.

In another exemplary embodiment, an antistiction layer is formed with an oriented monolayer covering the stopper and on the bottom surface of the micromirror device. The mirror gap of the mirror array of the micromirror device is 0.55 µm through 0.09 µm.

In another exemplary embodiment, the micromirror has at least two states of the ON light state and the OFF light state, and the deflection angle of the mirror is different between the ON light state and the OFF light state. In another exemplary embodiment, the micromirror has different areas of an address electrode or different positions of the address electrode between the ON light state and the OFF light state.

In another exemplary embodiment, the micromirror has at least three states of the ON light state, the OFF light state, and the oscillation state. In the oscillation state, the micromirror is controlled by a voltage lower than the voltage for holding it to the stopper portion in the ON light state or the OFF light state.

Figure 11:
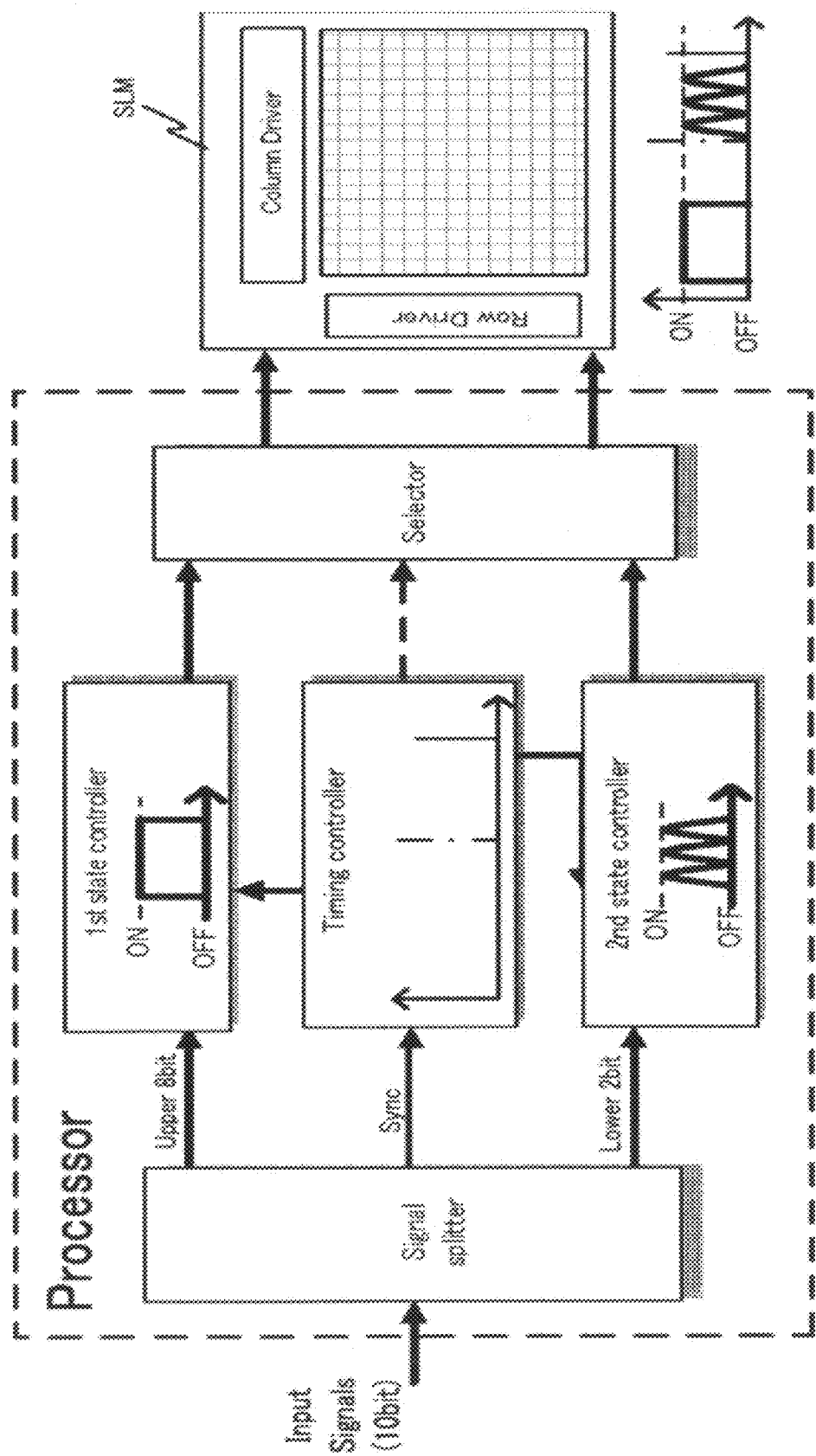
FIG. 11 is a functional block diagram for showing a system configuration and control schemes to implement digital and analog control signals in accordance with the present invention.

Referring to FIG. 11 for describing an external signal received by the micromirror device for controlling the micromirror device. FIG. 11 is a functional block diagram that illustrates an exemplary system of this invention. This system receives a 10-bit incoming signal. The ten-bit incoming signal is split into two parts, for example, upper 8 bits and lower 2 bits. The upper 8 bits are sent to the $1^{st}$ state controller, the lower 2 bits are sent to the $2^{nd}$ state controller and the sync signal is sent to the timing controller. The $2^{nd}$ state controller converts the binary data to non-binary data.

Thus, the $1^{st}$ state and the $2^{nd}$ state can coexist and applied to control the image display in one display frame. Furthermore, when the controller is applies the signal to control a single plate color sequential system, each color of red, green, and blue is sequentially displayed at 180 Hz or more. Preferably, the signals of three colors are processes and displayed at 360 Hz or more.

When a laser light source is used for as the light source of each color, a pulse emission is made according to the number of bits of a video signal, and a micromirror is controlled to deflect and reflect the light in each emission state.

For example, by applying an 8-bit video signal, the laser light source of each color is allowed to alternately emit a subframe once for an LSB (least significant bit) and twice for each other bit. A total of 15 times (900 Hz) of alternate emission corresponding to each subframe is applied to control the micromirrors. The micromirror is therefore controlled for deflecting the micromirror device corresponding to the emission period of the light source.

Furthermore, the control time of the $2^{nd}$ state may be assigned to each of the sub-frames corresponding to the three colors of red, green and blue. Additionally, the colors of cyan, magenta, and yellow may also be added to express images in 6 colors.

According to such control mechanism, the system increases the deflecting frequency of the micromirror device in synchronization with the emission from a light source in one frame. A shorter color switching period is achievable, and the color break-up phenomenon can be reduced, thereby the image display system presenting higher quality images, and increasing the gray scale levels. In the system shown in FIG. 11, a signal splitter generates a sync signal. A timing controller controls a selector according to the sync signal, and allows the selector to switch control of the micromirror device between the $1^{st}$ controller of the $2^{nd}$ controller. Since the human visibility is highest on the color of green, only green color is displayed in 14-bit gray scale, and other colors are displayed in 12-bit gray scale.

According to this system configuration and control method, the frequency of controlling the micromirror in the ON light state or the OFF light state increases. Furthermore, the illumination light of white including red, green, and blue can be emitted separate from the colors of red, green, and blue. Furthermore, the, white can be displayed only in the $1^{st}$ state. The descriptions of this patent application disclose the micromirror device for an image display system implemented with antistiction layer composed of oriented monolayer. Various advantages and performance benefits are described in various exemplary embodiments.

The present invention has been described above with reference to some examples of specific embodiments, but it is obvious that variations and amendments can be added to the embodiments within the scope of the gist of the present invention. Therefore, the specification and drawings of the present invention are not limited to any specific applications, but are regarded as examples only.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

What is claimed is:

1. A micromirror device, comprising:
    an elastic hinge for supporting a mirror on a substrate;
    an address electrode disposed on the substrate for applying electric signals for deflecting the mirror to deflect between two opposite maximum deflection angles;
    a protective layer covers and electrically insulates the address electrode for said address electrode to contact and stop the mirror in deflecting to one of said maximum deflection angles; and
    an oriented monolayer covers over at least a portion of said protective layer on said address electrode for contacting said mirror and preventing said mirror from sticking to said address electrode.

2. The device according to claim 1, wherein:
    the oriented monolayer is composed of a halogenated alkyl silicide compound or an alkyl silicide compound.

3. The device according to claim 1, wherein:
    the oriented monolayer is composed of a compound wherein all or a part of hydrogen-H coupled to a carbon chain portion of a molecule having a carbon chain is replaced with a halogen.

4. The device according to claim 1, wherein:
    the oriented monolayer is composed of a compound having a carbon chain with a saturated or unsaturated carbon bond wherein all or a part of hydrogen (H) coupled to the carbon chain is replaced with a halogen.

5. The device according to claim 1, wherein:
the oriented monolayer is composed of a compound comprising less than six molecules of fluorinated carbon.

6. The device according to claim 1, wherein:
the oriented monolayer is composed of a material of $CF_3(CF_2)_x(CH_2)_y Si(CH_3)_n Cl_{3-n}$ ($0 \leq n \leq 2$) where X and Y are positive integers.

7. The device according to claim 1, wherein:
the oriented monolayer covers over at least two portions of said protective layer on said address electrode for contacting said mirror and preventing said mirror from sticking to said address electrode.

8. The device according to claim 1, wherein:
the elastic hinge is composed of a silicon material; and doped or spread with at least one of the materials consisted of As, P, Ge, Ti, and Ni.

9. The device according to claim 1, wherein:
the protective layer is composed of one of the materials consisted of SiC, amorphous silicon, or polysilicon.

10. The device according to claim 1, wherein:
the protective layer is composed of one of the materials consisted of SiC, amorphous silicon, or polysilicon, and further includes coupled-Si—O— of oxygen and silicon.

11. A method for manufacturing a micromirror device, comprising:
forming an elastic hinge for supporting a mirror on a substrate;
forming an address electrode on the substrate for applying electric signals for deflecting the mirror to deflect between two opposite maximum deflection angles;
covering the address electrode with a protective layer to; electrically insulate the address electrode for stopping the mirror in deflecting to one of said maximum deflection angles and forming an oriented monolayer in a normal temperature for covering at least a portion of the protective layer on said address electrode for contacting said mirror and preventing said mirror from sticking to said address electrode.

12. The method according to claim 11, wherein:
said step of forming the oriented monolayer further comprises a step of forming the oriented monolayer in a normal temperature and a reduced pressure.

13. The method according to claim 11, wherein:
said step of forming the oriented monolayer further comprises a step of forming the oriented monolayer in a heated environment.

14. A method for manufacturing a micromirror device, comprising:
forming an address electrode on a substrate to contact and stop a mirror when deflecting to a maximum deflection angle;
covering the address electrode with a protective layer for electrically insulating said address electrode; and
forming an oriented monolayer in a normal temperature for cove ring at least a portion of the protective layer on said address electrode for contacting said mirror and preventing said mirror from sticking to said address electrode.

15. The method according to claim 14, wherein:
said step of forming said protective layer comprising a step of forming a silicon layer followed by forming an oxide layer on a surface of the silicon layer.

16. The method according to claim 14, wherein:
the step of forming the oriented monolayer further comprises a step of forming the oriented monolayer in a reduced pressure.

17. The method according to claim 14, wherein:
the step of forming the oriented monolayer further comprises a step of forming the oriented monolayer as a compound comprising less than six molecules of fluorinated carbon.

18. A micromechanical device, comprising:
an electrically insulated address electrode having a stopper portion of surfaces for contacting and stopping a deflectable micromirror when deflecting to a maximum deflection angle wherein said stopper portion is covered by an oriented monolayer composed of a material of $CF_3(CF_2)_x(CH_2)_y Si(CH_3)_n Cl_{3-n}$ ($0 \leq n \leq 2$) where X and Y are positive integers.

19. The device according to claim 18, wherein:
the electrically insulated address electrode is electrically connected to a mirror control device for receiving mirror control signals from said mirror control device.

20. The device according to claim 18, further comprising:
another electrically insulated address electrode constituting a first and second electrically insulated address electrodes for contacting and stopping the deflectable micromirror at two opposite maximum deflection angles.

* * * * *